(12) United States Patent
Holland et al.

(10) Patent No.: US 11,449,131 B2
(45) Date of Patent: Sep. 20, 2022

(54) OBFUSCATED CONTROL INTERFACES FOR EXTENDED REALITY

(71) Applicant: QUALCOMM Incorporated, San Diego, CA (US)

(72) Inventors: Wesley James Holland, Encinitas, CA (US); Ramesh Chandrasekhar, Oceanside, CA (US); Daniel James Guest, San Diego, CA (US); Sebastien Mounier, San Diego, CA (US); Bijan Forutanpour, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 16/941,412

(22) Filed: Jul. 28, 2020

(65) Prior Publication Data
US 2022/0035439 A1    Feb. 3, 2022

(51) Int. Cl.
*G06F 3/01* (2006.01)
*G06T 7/73* (2017.01)
(Continued)

(52) U.S. Cl.
CPC .......... *G06F 3/011* (2013.01); *G02B 27/0172* (2013.01); *G06T 7/73* (2017.01); *G06T 19/006* (2013.01); *G02B 2027/0123* (2013.01)

(58) Field of Classification Search
CPC ......... G06F 3/011; G06T 19/006; G06T 7/73; G02B 27/0172; G02B 2027/0123
See application file for complete search history.

(56) References Cited

U.S. PATENT DOCUMENTS 9,746,938 B2    8/2017  Gardner et al.
9,952,657 B2 *  4/2018  Nishi .................... G09G 5/026
(Continued)

FOREIGN PATENT DOCUMENTS

WO    2016074802 A1    5/2016

OTHER PUBLICATIONS

Lantz P., et al., "Visual Cryptography and Obfuscation: A Use-Case for Decrypting and Deobfuscating Information Using Augmented Reality", International Conference on Financial Cryptography and Data Security, LNCS, vol. 8976, Sep. 5, 2015, pp. 261-273.
(Continued)

*Primary Examiner* — Ryan A Lubit
(74) *Attorney, Agent, or Firm* — Qualcomm Incorporated

(57) ABSTRACT

Systems, methods, and non-transitory media are provided for generating obfuscated control interfaces for extended reality (XR) experiences. An example method can include determining a pose of an XR device within a mapped scene of a physical environment associated with the XR device; rendering a virtual control interface within the mapped scene according to a configuration including a first size, a first position relative to the pose of the XR device, a first ordering of input elements, and/or a first number of input elements; and adjusting the configuration of the virtual control interface based on a privacy characteristic of data associated with the virtual control interface and/or characteristics of the physical environment associated with the XR device, the adjusted configuration including a second size, a second ordering of input elements, a second number of input elements, and/or a second position relative to the pose of the XR device and/or first position.

30 Claims, 12 Drawing Sheets

(51) Int. Cl.
    G02B 27/01     (2006.01)
    G06T 19/00     (2011.01)

(56)            References Cited

U.S. PATENT DOCUMENTS

| | | | |
|---|---|---|---|
| 2014/0201844 A1* | 7/2014 | Buck | G06F 21/554 |
| | | | 726/26 |
| 2016/0188886 A1* | 6/2016 | Weiss | G06F 21/84 |
| | | | 726/26 |
| 2018/0107839 A1* | 4/2018 | Clement | G06F 3/017 |
| 2018/0158060 A1 | 6/2018 | Adams et al. | |
| 2019/0108623 A1* | 4/2019 | Carey | G06F 3/011 |
| 2020/0241647 A1* | 7/2020 | Kanda | G06F 3/147 |
| 2021/0191600 A1* | 6/2021 | Lemay | G06F 3/0485 |

OTHER PUBLICATIONS

Maiti A., et al., "Preventing Shoulder Surfing Using Randomized Augmented Reality Keyboards", Mar. 13, 2017, 26 Pages.
International Search Report and Written Opinion—PCT/US2021/039955—ISA/EPO—dated Oct. 27, 2021.
Maiti, A., et al., "Preventing Shoulder Surfing Using Randomized Augmented Reality Keyboards", 2017 IEEE International Conference on Pervasive Computing and Communications Workshops (Percom Workshops), IEEE, Mar. 13, 2017 (Mar. 13, 2017), XP033092360, pp. 630-635, DOI: 10.1109/PERCOMW.2017.7917636 [retrieved on May 2, 2017] Abstract. Sections I, III and IV and Fig. 1.

* cited by examiner

OBFUSCATED CONTROL INTERFACES FOR EXTENDED REALITY

TECHNICAL FIELD

The present disclosure generally relates to obfuscating virtual control interfaces in extended reality and other applications.

BACKGROUND

Extended reality technologies can be used to present virtual content to users, and/or can combine real environments from the physical world and virtual environments to provide users with extended reality experiences. The term extended reality can encompass virtual reality, augmented reality, mixed reality, and the like. Each of these forms of extended reality allows users to experience or interact with immersive virtual environments or content. For example, an extended reality experience can allow a user to interact with a real or physical environment enhanced or augmented with virtual content.

Extended reality technologies can be implemented to enhance user experiences in a wide range of contexts, such as entertainment, healthcare, retail, education, social media, among others. However, in many settings, it can be undesirable to reveal certain extended reality content or interactions with certain extended reality interfaces. In one example, a user many not want an authentication interface, such as a password prompt, to be rendered in a way that may allow other users to see or infer/interpret specific user interactions with the authentication interface or associated authentication information.

BRIEF SUMMARY

Disclosed are systems, methods, and computer-readable media for providing obfuscated control interfaces for extended reality experiences. According to at least one example, a method is provided for generating obfuscated control interfaces for extended reality experiences. The method can include determining a pose of an extended reality device within a mapped scene of a physical environment associated with the extended reality device; rendering a virtual control interface within the mapped scene, the virtual control interface being rendered according to a configuration including a first size, a first position relative to the pose of the extended reality device, a first ordering of input elements, and/or a first number of input elements; and adjusting a configuration of the virtual control interface based on at least one of a privacy characteristic of data associated with the virtual control interface and one or more characteristics of the physical environment associated with the extended reality device, the adjusted configuration including a second size, a second ordering of input elements, a second number of input elements, and/or a second position relative to the pose of the extended reality device and/or different from the first position.

According to at least one example, an apparatus is provided for generating obfuscated control interfaces for extended reality experiences. In some examples, the apparatus can be or include an extended reality device. Moreover, the apparatus can include memory and one or more processors coupled to the memory, the one or more processors being configured to determine a pose of the extended reality device within a mapped scene of a physical environment associated with the extended reality device; render a virtual control interface within the mapped scene, the virtual control interface being rendered according to a configuration including a first size, a first position relative to the pose of the extended reality device, a first ordering of input elements, and/or a first number of input elements; and adjust the configuration of the virtual control interface based on at least one of a privacy characteristic of data associated with the virtual control interface and one or more characteristics of the physical environment associated with the extended reality device, the adjusted configuration including a second size, a second ordering of input elements, a second number of input elements, and/or a second position relative to the pose of the extended reality device and/or different from the first position.

According to at least one example, a non-transitory computer-readable medium is provided for generating obfuscated control interfaces for extended reality experiences. The non-transitory computer-readable medium can include determine a pose of the apparatus within a mapped scene of a physical environment associated with the apparatus; render a virtual control interface within the mapped scene, the virtual control interface being rendered according to a configuration including a first size, a first position relative to the pose of the apparatus, a first ordering of input elements, and/or a first number of input elements; and adjust the configuration of the virtual control interface based on at least one of a privacy characteristic of data associated with the virtual control interface and one or more characteristics of the physical environment associated with the extended reality device, the adjusted configuration including a second size, a second ordering of input elements, a second number of input elements, and/or a second position relative to the pose of the apparatus and/or different from the first position.

According to at least one example, an apparatus is provided for generating obfuscated control interfaces for extended reality experiences. In some examples, the apparatus can be or include an extended reality device. Moreover, the apparatus can include means for determining a pose of the extended reality device within a mapped scene of a physical environment associated with the extended reality device; rendering a virtual control interface within the mapped scene, the virtual control interface being rendered according to a configuration including a first size, a first position relative to the pose of the extended reality device, a first ordering of input elements, and/or a first number of input elements; and adjusting the configuration of the virtual control interface based on at least one of a privacy characteristic of data associated with the virtual control interface and one or more characteristics of the physical environment associated with the extended reality device, the adjusted configuration including a second size, a second ordering of input elements, a second number of input elements, and/or a second position relative to the pose of the extended reality device and/or different from the first position.

In some aspects, the method, apparatuses, and non-transitory computer-readable storage medium described above can include receiving a number of inputs via the virtual control interface, and based on receiving the number of inputs via the virtual control interface, switching the rendering of the virtual control interface from the configuration to the adjusted configuration.

In some aspects, the one or more characteristics of the physical environment can include a presence in the physical environment of a person, one or more recording devices, and/or one or more objects that enable viewing access to one or more regions in the physical environment from outside of the physical environment. In some aspects, the method, apparatuses, and non-transitory computer-readable storage medium described above can include determining that the virtual control interface is mapped to a region in the physical environment that is within a field of view (FOV) of a person in the physical environment, a recording device in the physical environment, and/or an object in the physical environment that enables viewing access to the region from outside of the physical environment, wherein the person is different from a user associated with the extended reality device; and based on determining that the virtual control interface is mapped to the region in the physical environment, switching the rendering of the virtual control interface from the configuration to the adjusted configuration.

In some examples, adjusting the configuration of the virtual control interface can include reordering one or more input elements of the virtual control interface according to the second ordering of input elements. In some cases, the one or more input elements can be reordered relative to one or more different input elements of the virtual control interface, and reordering the one or more input elements can include rendering the one or more input elements according to a position and/or an ordering of the one or more different input elements corresponding to the first ordering of input elements.

In some examples, rendering the virtual control interface according to the configuration can include rendering one or more input elements of the virtual control interface at the first position. In some cases, adjusting the configuration of the virtual control interface can include rendering one or more different input elements of the virtual control interface at the second position.

In some examples, the virtual control interface can include a virtual keyboard and the input elements can include virtual keys. In some aspects, the method, apparatuses, and non-transitory computer-readable storage medium described above can include receiving a selection of a virtual key of the virtual keyboard while the virtual keyboard is rendered according to the configuration and, after receiving the selection of the virtual key, rendering the virtual keyboard according to the adjusted configuration.

In some cases, adjusting the configuration of the virtual keyboard can include rendering the virtual key at a same position within the mapped scene used to render the virtual key during the configuration while rendering one or more different virtual keys of the virtual keyboard at a different position within the mapped scene used to render the one or more different virtual keys during the configuration.

In some cases, adjusting the configuration of the virtual keyboard can include rendering the virtual keyboard according to the second size and the second position, the second size and the second position being different than the first size and the first position.

In some aspects, the method, apparatuses, and non-transitory computer-readable storage medium described above can include rendering, while the virtual keyboard is rendered according to the configuration, a set of predictive input elements, the set of predictive input elements being rendered according to an additional configuration including a third size, a third position, and/or a third ordering relative to each other; updating, based on the selection of the virtual key, a content and/or a functionality associated with one or more predictive elements of the set of predictive input elements; and switching the rendering of the set of predictive input elements from the additional configuration to a different additional configuration, the different additional configuration including a fourth size, a fourth position, and/or a fourth ordering relative to each other.

In some aspects, the method, apparatuses, and non-transitory computer-readable storage medium described above can include detecting a region within the physical environment estimated to be within a field of view (FOV) of a user associated with the extended reality device and out of a respective FOV of a person in the physical environment, a recording device in the physical environment, and/or an object in the physical environment that enables viewing access from outside of the physical environment. In some examples, the first position, the second position, the first size, and/or the second size can be selected based on the region estimated to be within the FOV of the user and out of the respective FOV of the person, the recording device, and/or the object.

In some aspects, the method, apparatuses, and non-transitory computer-readable storage medium described above can include rendering a decoy input element, the decoy input element being rendered after rendering the virtual control interface according to the configuration; receiving a selection of the decoy input element; and in response to the selection of the decoy input element, rendering the virtual control interface according to the adjusted configuration.

In some aspects, the method, apparatuses, and non-transitory computer-readable storage medium described above can include detecting one or more events associated with the virtual control interface, and based on the one or more events, switching the rendering of the virtual control interface from the configuration to the adjusted configuration. In some examples the one or more events can include a timeout event, a security condition, and/or an unexpected input.

In some aspects, each apparatus described above is or includes a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the various advantages and features of the disclosure can be obtained, a more particular description of the principles described above will be rendered by reference to specific embodiments thereof, which are illustrated in the appended drawings. Understanding that these drawings depict only example embodiments of the disclosure and are not to be considered to limit its scope, the principles herein are described and explained with additional specificity and detail through the use of the drawings in which.

DETAILED DESCRIPTION

Figure 1:
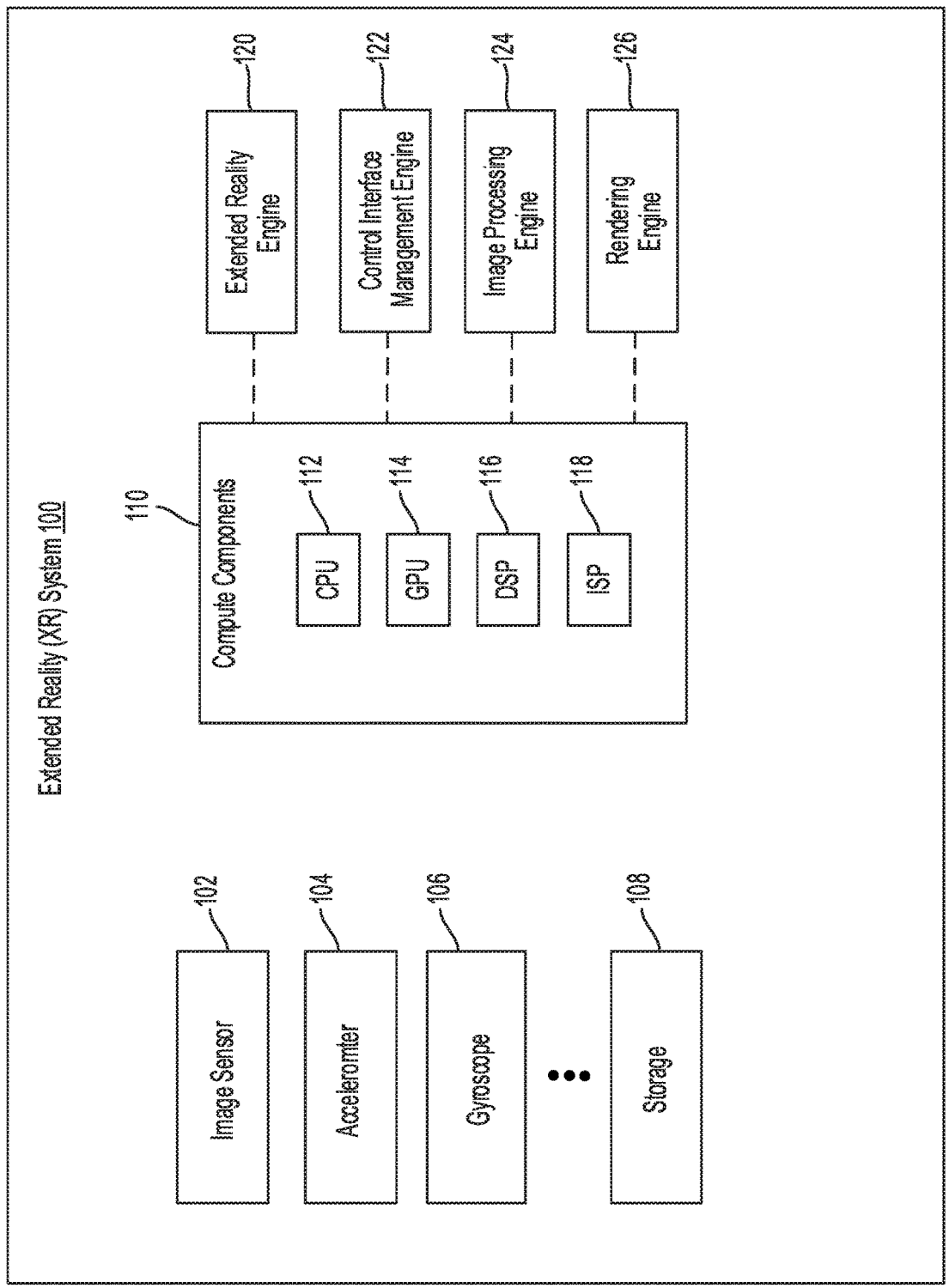
FIG. 1 is a simplified block diagram illustrating an example extended reality system, in accordance with some examples of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides example embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Extended reality devices, such as head-mounted displays (HMDs) and smart glasses, can track the hand and/or fingertips of users to allow users to use their hand and/or fingertips to control interfaces rendered within an extended reality (XR) environment, such as a virtual reality (VR) environment, an augmented reality (AR) environment, a mixed reality (MR) environment, and/or other XR environment. A user's hand or fingertip interactions with a control interface in an XR environment can be visible by other users in the environment. However, it is often undesirable to reveal such interactions with the control interface and/or to allow the meaning of such interactions and/or the significance of input elements on the control interface to be potentially interpreted by other users. For instance, if a user engaged in a multi-user AR experience inputs private information using a control interface rendered during the multi-user AR experience, other users in the multi-user AR experience will be able to see the control interface through their own AR experience as well as the user's interactions with the control interface. Consequently, if the control interface presented to the various users in the multi-user experience is the same, the other users may be able to ascertain any information provided by the user through the user's interactions with the control interface. As a result, the user may inadvertently expose such information to the other users which, in some cases, may include private, confidential, or personal information.

In some cases, even if other users are not able to see the control interface or the interface elements that a user is interacting with during an XR experience, the hand or fingertip interactions of the user may still be interpretable by others, in which case inputs (and corresponding information) associated with the interactions may be inferred by the other users. For example, if the user is engaged in an AR experience around other users, the other users may be able to see the user's hand and/or fingertip interactions with the control interface. Moreover, the user's hand and/or fingertip interactions may reveal that the user is air typing on a virtual keyboard or interacting with some other virtual interface. Based on the user's hand and/or fingertip movements or patterns in the user's hand and/or fingertip movements and knowledge of the typical configuration of virtual keyboards, other users may be able to infer the type of virtual interface the user is interacting with and interpret the inputs provided by the user. The inputs may consequently reveal the user's information which, in many cases, may involve private or confidential information.

Additionally, if the user's interactions with the virtual interface are within a field-of-view (FOV) of a recording device, such as a camera, the user's interactions could inadvertently be recorded by the recording device. Another user with access to the recording could then review the recording and interpret the user's interactions and associated information from the recording. The recording may even allow the other user to interpret the user's interactions and associated information with greater ease and/or accuracy. In some cases, the other user can use a computer to process the recording and recognize the user's interactions and associated information from the recorded video, potentially putting the privacy of the user's information at an even greater risk.

In some cases, the other user could even use an artificial intelligence (AI) interpreter or system to process the recorded video and identify the information provided by the user through the virtual interface. The AI interpreter or system could potentially recognize the information provided by the user through the virtual interface with significant accuracy. Accordingly, when a user is engaged in an XR experience, to avoid exposing inputs and associated information to other users, the user may want to protect the privacy of interactions with virtual interfaces rendered in the XR environment even if other users are not also engaged in the XR experience or able to see the virtual interface.

In one illustrative example, a user's interaction with a virtual interface rendered during an XR experience, such as a virtual keyboard, to enter a password can potentially be interpreted by other users, which can allow such users to identify or infer the password entered by the user. As previously noted, the other users may be able to infer the password entered by the user even if the other users are not engaged in the same XR experience or able to see the virtual interface. To illustrate, in a typing XR setting using a virtual keyboard, a user's typing motions can indicate an interaction with the virtual keyboard. The typing motions may allow other users to infer key locations and typed data, such as a typed password. Such exposure of typed data, such as password information, can present significant security and privacy concerns to the user.

In another example, a user's interaction with a virtual voting button in a virtual classroom poll or quiz can be interpreted by other users, which can allow the other users to identify or infer the vote submitted by the user and compromise the integrity of the user's vote and/or the classroom poll or quiz. For example, other users taking the same virtual classroom poll or quiz may be able to see the virtual interface used for the virtual classroom poll or quiz. Accordingly, if the other users see the user's interaction with the virtual button on the virtual interface, the other users may be able to identify the user's answer to the classroom poll or quiz. Even if the other users are not also taking the virtual classroom poll or quiz or otherwise able to see the virtual voting button, the users may still be able to infer the location and significance of input buttons selected by the user through observation over multiple questions. By inferring the location and significance of the input buttons, the other users may deduce the votes submitted by the user through the virtual classroom poll or quiz.

Similarly, a user's interaction with virtual gaming controls in a multi-user AR gaming experience, such as a multi-user AR table-top game, can be interpreted by other users. For example, users in a multi-user AR gaming experience can see virtual gaming content mixed with the physical world around them (e.g., rendered on physical objects or regions), and thus may see the virtual gaming controls throughout the multi-user AR gamin experience as well as the user's interaction with the virtual gaming controls. Accordingly, the other users may be able to identify or infer the user's input through the virtual gaming controls. Moreover, in some cases, even if the users are unable to see the same virtual gaming controls, the other users may be able to infer the location and significance of input buttons selected by the user by observing the user's interactions throughout the game. This may allow the other users in the game to deduce the user's inputs and associated information in the game. However, in many cases, such as competitive gaming scenarios, the user many not want other users in the multi-user AR game to learn the user's input through the virtual gaming controls as it can put the user in a competitive disadvantage with those other users.

The present disclosure describes systems, methods, and computer-readable media for generating obfuscated control interfaces for XR experiences. In some examples, the approaches disclosed herein can vary and/or randomize aspects of virtual control interfaces presented to a user as part of an XR environment to obfuscate the configuration of such virtual control interfaces and the significance of interface elements from other users, devices and/or objects in the physical environment of the user, to prevent other users and/or devices from interpreting the user's interactions with the virtual control interfaces and protect the privacy of the user's interactions and data from other users and/or devices. A virtual control interface can also be referred to herein as a virtual interface. In some examples, the virtual control interfaces can be rendered within a region of the physical environment of the user (e.g., the real-world environment). As used herein, a control interface (e.g., an obfuscated control interface, a virtual control interface, etc.) can include a rendered interface with input fields and/or input interface elements, but can also include a rendered interface without input fields and/or input interface elements, such as an interface with static or display-only content.

The region used to render a virtual interface can be, for example and without limitation, a region or location in the user's physical environment (e.g., the real world). The region can be used to render virtual control interfaces for a user during an XR experience to allow the user to interface with the virtual interface during the XR experience. In some examples, one or more aspects of the virtual interface can be obfuscated to prevent unintended users and devices from interpreting the meaning of the input elements on the virtual interface and, consequently, the user's interactions with the virtual control interface and associated data entered by the user through such virtual control interface. In some examples, rendering a virtual control interface can include rendering or displaying the virtual control interface through an XR device in a manner that appears to a user viewing the virtual control interface through/from the XR device as if the virtual control interface was presented, projected, overlaid or located on a region of the physical environment. For example, rendering a virtual control interface can include rendering a virtual overlay of the virtual control interface on a region in the physical environment. In other examples, rendering a virtual control interface can include projecting the virtual control interface on a region or location in the physical environment.

In some examples, one or more aspects of the virtual control interface rendered can be obfuscated from other users to prevent other users from interpreting the meaning of input elements on the virtual control interface and ascertaining the inputs by the user through the virtual control interface. Because the meaning or significance of input elements is not known or inferred by other users and/or devices in the physical environment, the other users and/or devices will not be able to infer input data associated with the user's interactions with the virtual control interface.

For example, in the virtual keyboard example above, the position, order, size, and/or configuration of the virtual keyboard and/or keys on the virtual keyboard can be modified or randomized when rendered to the user to prevent other users in the physical environment from inferring key locations or typed data. The user can see the virtual keyboard through an XR device (e.g., a head-mounted display, AR glasses, etc.), but other users or devices will not be able to infer or understand the configuration of the virtual keyboard or the location of specific keys in the virtual keyboard. Accordingly, the other users will not be able to infer or understand the user's interactions with the virtual keyboard to potentially infer the information entered by the user through the virtual keyboard, even if the users are also using an XR device and engaged in the same XR experience as the user or otherwise capable of seeing the user's movements corresponding to the user's interactions.

In the virtual classroom poll or quiz example above, the virtual buttons reordered when rendered within the virtual interface and/or combined with fake, decoy, or non-functional virtual buttons to prevent other users in the physical environment from inferring the location and significance of such virtual buttons and thereby inferring user inputs. The user can see the virtual buttons through an XR device, but other users or devices will not be able to ascertain the meaning of the user's interactions with the virtual interface. In the multi-user AR gaming example above, the configuration and/or number of virtual buttons in the AR game can be changed when rendered in the physical environment for the user to prevent other users in the physical environment and/or engaged in the AR game from inferring the location and significance of the buttons and thereby inferring user inputs. Again, the other users or devices will not be able to understand the meaning or significance of the user's interactions with the virtual buttons even if such users or devices are capable of seeing the user's movements or the users are also engaged in the AR game.

In some examples, an XR device of the user can identify a front-facing surface or plane in a physical environment relative to the user's position/location in the physical environment, and determine whether any portions of that surface or plane are outside of a view of other users or recording devices or whether that surface or plane is obscured from other users or recording devices. If any portions of the surface or plane are outside of a view of, or obscured from, other users or recording devices, such portions of the surface or plane can be used to help conceal the configuration of a virtual interface and the meaning of at least some input elements of the virtual interface by rendering at least a portion of the virtual interface within such portions of the surface or plane.

For example, the user will be able to see the virtual control interface rendered on that surface or plane through the XR device. However, without being able to see the entire region in the physical environment used to render the virtual control interface and/or interactions by the user with elements of the virtual control interface rendered within an obfuscated region in the physical environment, other users may not be able to recognize details and/or patterns regarding the configuration of the virtual control interface (including the virtual control interface as a whole and/or those portions of the virtual control interface rendered within the obfuscated region) and/or user interactions with the virtual control interface (including interactions with the virtual control interface as a whole and/or those portions of the virtual control interface rendered within the obfuscated region).

With more incomplete data about the virtual control interface and/or user interactions with the virtual control interface, the other users or devices may not be able to interpret (or may have greater difficulty interpreting) the configuration of the virtual control interface, the meaning of input elements on the virtual control interface, and/or at least some of the user's interactions with the virtual control interface. If, in addition to rendering at least a portion of the virtual control interface within a region of the physical environment that is not visible by other users or devices, a configuration of the virtual control interface is modified or randomized, the other users or devices may have even more difficulty inferring the configuration of the virtual control interface, understanding the meaning of the input elements on the virtual control interface and/or understanding the meaning of the user's interactions with the virtual control interface.

To illustrate, the XR device of the user can detect a book, a clipboard, the user's hand, a mobile phone, or any other object located in front of the user (or within a FOV of the user) in the physical environment and can determine that at least a portion of the surface of the book, clipboard, hand, mobile phone, or other object facing the user (or within the FOV of the user) is outside of a view of, or occluded (e.g., by one or more objects) from, other users and/or recording devices in the physical environment. The XR device can then render any virtual control interface such that it appears to the user to be on that surface of the book, clipboard, hand, mobile phone, or other object when viewed from the XR device. Since the virtual control interface appears to the user with the XR device to be rendered on the surface of the book, clipboard, hand, mobile phone, or other object, the user will interact with the virtual control interface as if the virtual control interface is actually on the surface of the book, clipboard, hand, mobile phone, or other object in the physical environment. Because at least a portion of the surface of the book, clipboard, hand, mobile phone, or other object is not visible to other users and/or recording devices in the physical environment, the other users and/or recording devices will not be able to see all of the user's interactions with the virtual control interface.

Without being able to see all the user's interactions with the virtual control interface, the users and/or recording devices will have more incomplete information about the configuration of the virtual control interface and the user's interactions with the virtual control interface. Consequently, the users and/or recording devices will have more difficulty deciphering the configuration of the virtual control interface or the meaning of input elements on the virtual control interface. If the configuration of the virtual control interface is further modified so input elements are more difficult to infer (e.g., by adjusting aspects of the virtual control interface as described herein), other users or devices in the physical environment may have an even more difficult time ascertaining the configuration of the virtual control interface, and the meaning of input elements on the virtual control interface or user interactions with the virtual control interface. This way, the XR device can protect the user's interactions and data provided through the virtual control interface.

In some cases, the XR device can detect human faces (e.g., the faces of the user associated with the XR device and/or other users) and use human face recognition data (e.g., data indicating a presence and/or location of one or more users) and/or occlusion data (e.g., data indicating that an area or location is occluded by one or more objects or otherwise occluded from other users or devices) to detect any locations (e.g., private surfaces, regions, locations, planes, etc.) that are occluded from (or outside a view of) other users and devices in the physical environment, except for the user associated with the XR device. The human face recognition data can be self-reported by other devices, provided by the user associated with the XR device, detected by the XR device using facial recognition technologies (e.g., neural networks, facial recognition algorithms, etc.), and/or detected by a server in communication with the XR device using information provided by the XR device and using facial recognition technologies. In some cases, the occlusion data can be calculated using ray tracing or other mechanism(s). The XR device can then render at least a portion of a virtual control interface within the locations in the physical environment to help obscure the configuration of the virtual control interface and/or the user's interactions with the virtual control interface, which other users may try to use to try to infer the configuration of the virtual control interface and/or the significance of input elements on the virtual control interface.

In some examples, the XR device can resize (e.g., scale), reorient, reposition, and/or reconfigure the virtual control interface so other users or devices observing the user's interactions with the virtual control interface may not be able to use the user's interactions to ascertain the layout of the virtual control interface, associated input elements and/or the data entered by the user through the virtual control interface. For example, the number or ordering of input options on a virtual control interface can be modified or randomized to prevent other users from ascertaining the meaning of the input options and the associated user interactions. As another example, input elements on a virtual interface can be rendered along with fake, decoy, or non-functional input elements to obscure the relative position of such input elements and prevent other users from interpreting user interactions with such input elements.

In some cases, the XR device can determine whether to render an obfuscated virtual control interface based on, for example and without limitation, user preferences, system preferences (e.g., XR device preferences), application preferences (e.g., XR application preferences), application and/or content terms, laws or regulations, best practices, security norms, potential security implications or risks associated with the virtual control interface and/or associated data, the type of information associated with the virtual control interface, the type of virtual control interface, a level of privacy, etc. For example, a user can specify what applications, controls, and/or types of data should be private. The XR device can then render obfuscated virtual control interfaces associated with such applications, controls, and/or types of data within private locations. In other examples, the XR device can always present obfuscated virtual control interfaces or modify the pattern or sequence it uses to switch between rendering obfuscated virtual control interfaces and non-obfuscated virtual control interfaces.

Figure 11:
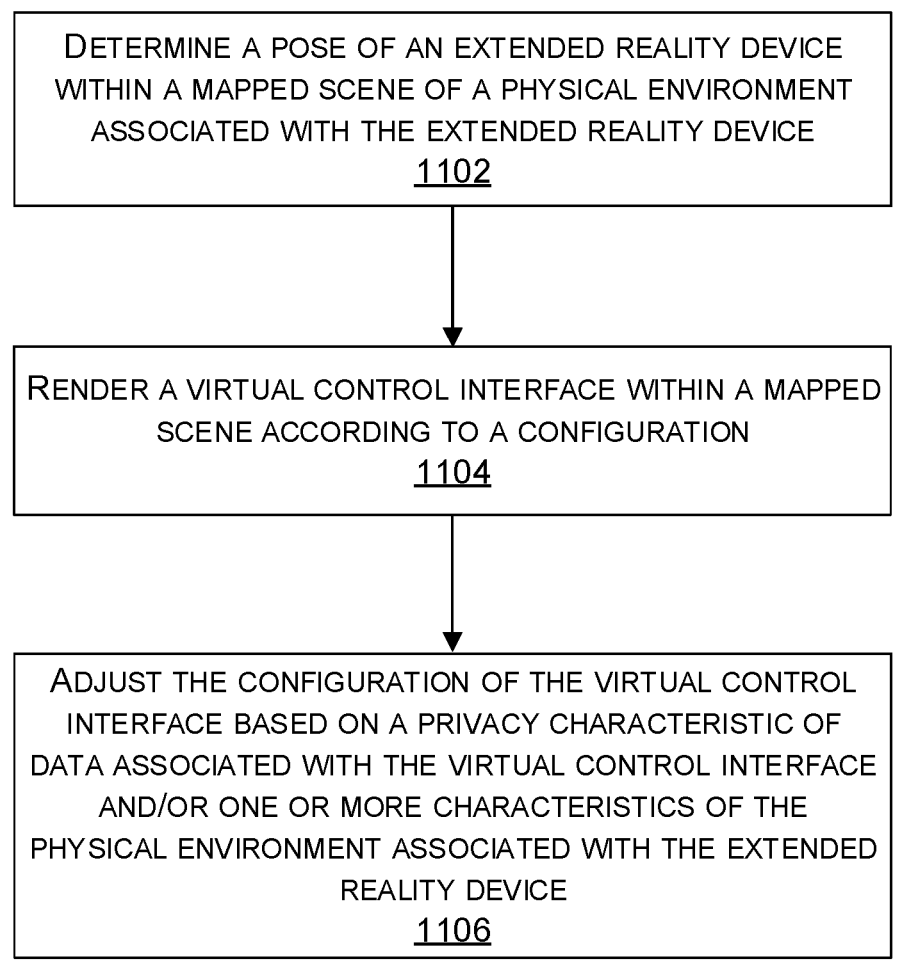
FIG. 11 is a flow diagram illustrating an example method for generating obfuscated control interfaces for extended reality experiences, in accordance with some examples of the present disclosure.
Figure 12:
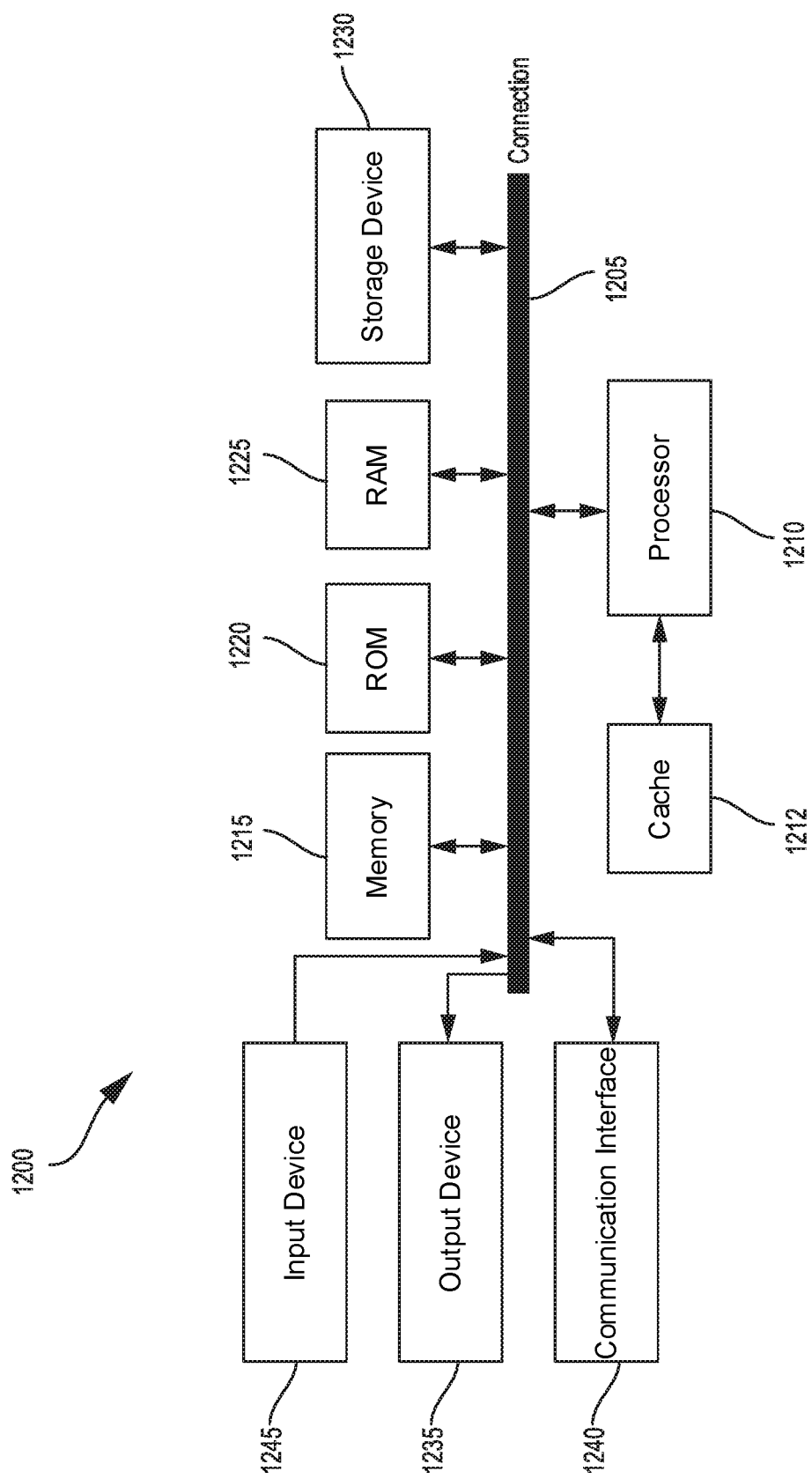
FIG. 12 illustrates an example computing device architecture, in accordance with some examples of the present disclosure.

The present technologies will be described in the following disclosure as follows. The discussion begins with a description of example systems and technologies for providing obfuscated interface controls for XR experiences, as illustrated in FIG. 1 through FIG. 10. A description of an example method for providing obfuscated interface controls for XR experiences, as illustrated in FIG. 11, will then follow. The discussion concludes with a description of an example computing device architecture including example hardware components suitable for performing XR functionalities and providing obfuscated interface controls for XR experiences, as illustrated in FIG. 12. The disclosure now turns to FIG. 1

FIG. 1 is a diagram illustrating an example extended reality system 100, in accordance with some aspects of the disclosure. The extended reality system 100 can run (or execute) XR applications and implement XR operations. In some examples, the extended reality system 100 can perform tracking and localization, mapping of the physical world (e.g., a scene), and positioning and rendering of virtual content on a screen, display, and/or visible plane/region as part of an XR experience. For example, the extended reality system 100 can generate a map (e.g., a three-dimensional (3D) map) of a scene in the physical world, track a pose (e.g., location and position) of the extended reality system 100 relative to the scene (e.g., relative to the 3D map of the scene), position and/or anchor virtual content in a specific location(s) on the map of the scene, and render the virtual content on a display/screen such that the virtual content appears to be at a location in the scene corresponding to the specific location on the map of the scene where the virtual content is positioned and/or anchored.

In this illustrative example, the extended reality system 100 includes one or more image sensors 102, an accelerometer 104, a gyroscope 106, storage 108, compute components 110, an XR engine 120, a control interface management engine 122, an image processing engine 124, and a rendering engine 126. It should be noted that the components 102-126 shown in FIG. 1 are non-limiting examples provided for illustrative and explanation purposes, and other examples can include more, less, or different components than those shown in FIG. 1. For example, in some cases, the extended reality system 100 can include one or more other sensors (e.g., one or more inertial measurement units (IMUs), radars, light detection and ranging (LIDAR) sensors, audio sensors, etc.), one or more display devices, one more other processing engines, one or more other hardware components, and/or one or more other software and/or hardware components that are not shown in FIG. 1. An example architecture and example hardware components that can be implemented by the extended reality system 100 are further described below with respect to FIG. 11.

Moreover, for simplicity and explanation purposes, the one or more image sensors 102 will be referenced herein as an image sensor 102 (e.g., in singular form). However, one of ordinary skill in the art will recognize that the extended reality system 100 can include a single image sensor or multiple image sensors. Also, references to any of the components (e.g., 102-126) of the extended reality system 100 in the singular or plural form should not be interpreted as limiting the number of such components implemented by the extended reality system 100 to one or more than one. For example, references to an accelerometer 104 in the singular form should not be interpreted as limiting the number of accelerometers implemented by the extended reality system 100 to one. One of ordinary skill in the art will recognize that, for any of the components 102-126 shown in FIG. 1, the extended reality system 100 can include only one of such component(s) or more than one of such component(s).

The extended reality system 100 can be part of, or implemented by, a single computing device or multiple computing devices. In some examples, the extended reality system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, a laptop or notebook computer, a tablet computer, a set-top box, a smart television, a display device, a gaming console, a video streaming device, an IoT (Internet-of-Things) device, a smart wearable device (e.g., a head-mounted display (HMD), smart glasses, etc.), or any other suitable electronic device(s).

In some implementations, the one or more image sensors 102, the accelerometer 104, the gyroscope 106, storage 108, compute components 110, XR engine 120, control interface management engine 122, image processing engine 124, and rendering engine 126 can be part of the same computing device. For example, in some cases, the one or more image sensors 102, the accelerometer 104, the gyroscope 106, storage 108, compute components 110, XR engine 120, control interface management engine 122, image processing engine 124, and rendering engine 126 can be integrated into a smartphone, laptop, tablet computer, smart wearable device, gaming system, and/or any other computing device. However, in some implementations, the one or more image sensors 102, the accelerometer 104, the gyroscope 106, storage 108, compute components 110, XR engine 120, control interface management engine 122, image processing engine 124, and rendering engine 126 can be part of two or more separate computing devices. For example, in some cases, some of the components 102-126 can be part of, or implemented by, one computing device and the remaining components can be part of, or implemented by, one or more other computing devices.

The image sensor 102 can include any image and/or video sensors or capturing devices, such as a digital camera sensor, a video camera sensor, a smartphone camera sensor, an image/video capture device on an electronic apparatus such as a television or computer, a camera, etc. In some cases, the image sensor 102 can be part of a camera or computing device such as an XR device (e.g., an HMD, smart glasses, etc.), a digital camera, a smartphone, a smart television, a game system, etc. In some examples, the image sensor 102 can be part of a multiple-camera assembly, such as a dual-camera assembly. The image sensor 102 can capture image and/or video content (e.g., raw image and/or video data), which can then be processed by the compute components 110, the XR engine 120, the control interface management engine 122, the image processing engine 124, and/or the rendering engine 126 as described herein.

In some examples, the image sensor 102 can capture image data and generate frames based on the image data and/or provide the image data or frames to the XR engine 120, the control interface management engine 122, the image processing engine 124 and/or the rendering engine 126 for processing. A frame can include a video frame of a video sequence or a still image. A frame can include a pixel array representing a scene. For example, a frame can be a red-green-blue (RGB) frame having red, green, and blue color components per pixel; a luma, chroma-red, chroma-blue (YCbCr) frame having a luma component and two chroma (color) components (chroma-red and chroma-blue) per pixel; or any other suitable type of color or monochrome picture.

The accelerometer 104 can detect acceleration by the extended reality system 100 and generate acceleration measurements based on the detected acceleration. The gyroscope 106 can detect and measure the orientation and angular velocity of the extended reality system 100. For example, the gyroscope 106 can be used to measure the pitch, roll, and yaw of the extended reality system 100. In some examples, the image sensor 102 and/or the XR engine 120 can use measurements obtained by the accelerometer 104 and the gyroscope 106 to calculate the pose of the extended reality system 100. As previously noted, in other examples, the extended reality system 100 can also include other sensors, such as a magnetometer, a machine vision sensor, a smart scene sensor, a speech recognition sensor, an impact sensor, a shock sensor, a position sensor, a tilt sensor, etc.

The storage 108 can be any storage device(s) for storing data. Moreover, the storage 108 can store data from any of the components of the extended reality system 100. For example, the storage 108 can store data from the image sensor 102 (e.g., image or video data), data from the accelerometer 104 (e.g., measurements), data from the gyroscope 106 (e.g., measurements), data from the compute components 110 (e.g., processing parameters, preferences, virtual content, rendering content, scene maps, tracking and localization data, object detection data, privacy data, XR application data, face recognition data, occlusion data, etc.), data from the XR engine 120, data from the control interface management engine 122, data from the image processing engine 124, and/or data from the rendering engine 126 (e.g., output frames). In some examples, the storage 108 can include a buffer for storing frames for processing by the compute components 110.

The one or more compute components 110 can include a central processing unit (CPU) 112, a graphics processing unit (GPU) 114, a digital signal processor (DSP) 116, and/or an image signal processor (ISP) 118. The compute components 110 can perform various operations such as image enhancement, computer vision, graphics rendering, extended reality (e.g., tracking, localization, pose estimation, mapping, content anchoring, content rendering, etc.), image/video processing, sensor processing, recognition (e.g., text recognition, facial recognition, object recognition, feature recognition, tracking or pattern recognition, scene recognition, occlusion detection, etc.), machine learning, filtering, and any of the various operations described herein. In this example, the compute components 110 implement the XR engine 120, the control interface management engine 122, the image processing engine 124, and the rendering engine 126. In other examples, the compute components 110 can also implement one or more other processing engines.

The operations for the XR engine 120, the control interface management engine 122, the image processing engine 124, and the rendering engine 126 (and any image processing engines) can be implemented by any of the compute components 110. In one illustrative example, the operations of the rendering engine 126 can be implemented by the GPU 114, and the operations of the XR engine 120, the control interface management engine 122, and the image processing engine 124 can be implemented by the CPU 112, the DSP 116, and/or the ISP 118. In some cases, the compute components 110 can include other electronic circuits or hardware, computer software, firmware, or any combination thereof, to perform any of the various operations described herein.

In some examples, the XR engine 120 can perform XR operations based on data from the image sensor 102, the accelerometer 104, the gyroscope 106, and/or one or more sensors on the extended reality system 100, such as one or more IMUs, radars, etc. In some examples, the XR engine 120 can perform tracking, localization, pose estimation, mapping, content anchoring operations and/or any other XR operations/functionalities.

The control interface management engine 122 can perform various operations to determine (and manage) how, where, and/or when to render control interfaces, including obfuscated control interfaces, during an XR experience. An XR experience can include use of the extended reality system 100 to present XR content (e.g., virtual reality content, augmented reality content, mixed reality content, etc.) to a user. In some examples, the XR content and experience can be provided by the extended reality system 100 through an XR application that provides a specific XR experience such as, for example, an XR gaming experience, an XR classroom experience, an XR shopping experience, an XR entertainment experience, an XR activity (e.g., an operation, a troubleshooting activity, etc.), among other. During the XR experience, the user can view and/or interact with virtual content using the extended reality system 100. In some cases, the user can view and/or interact with the virtual content while also being able to view and/or interact with the physical environment around the user, allowing the user to have an immersive experience between the physical environment and virtual content mixed or integrated with the physical environment.

Obfuscated control interfaces can include any virtual interfaces that display virtual data and/or receive input data where the control interfaces and/or the rendering of the control interfaces are configured and/or modified in ways intended to hide from other users or devices the configuration of the control interface, interface elements on the control interface, and/or the meaning of user interactions with the control interface so that other users or devices are unable (or have greater difficult) to interpret user interactions with the control interface and thereby determine user data provided through the control interface. In some cases, obfuscated interfaces can include any virtual interfaces configured to be private and/or configured to protect from other users or devices private and/or protected data rendered and/or entered through the virtual interfaces. In some cases, virtual interfaces and/or associated data can be defined as, or determined to be, private and/or protected based on, for example and without limitation, user preferences, system preferences, application preferences, application and/or content terms, laws or regulations, best practices, security norms, potential security implications, etc. Non-limiting examples of private and/or protected data can include personal user data, passwords, pins, medical information, financial information, authentication information, player information in multi-user games, security information, password-protected data, data protected by access control lists (ACLs) and/or permissions, user account data, privileged or confidential data, etc.

In some examples, the control interface management engine 122 can use data from the image sensor 102, the accelerometer 104, the gyroscope 106, and/or any other sensors to detect objects (e.g., windows, doors, walls, tables, books, devices, chairs, etc.) in a scene, recognize faces in a scene, detect surveillance devices in a scene (e.g., cameras, microphones, etc.), and/or any other conditions and/or characteristics of a scene, and can use such information to determine whether to obfuscate a virtual control interface and/or how to obfuscate a virtual control interface. In some examples, the control interface management engine 122 can also use data from other devices or applications, such as self-reported data from other user devices and/or data provided by a user of the extended reality system 100.

In some cases, the control interface management engine 122 can use such data to identify occlusions in the scene, which can be used to render/display at least a portion of an obfuscated control interface for the user associated with the extended reality system 100 to protect the obfuscated control interface from viewing access and/or interpretation by other users, surveillance devices, etc. As previously explained, the occlusions can be used to hide at least a portion of the obfuscated control interface from other user's and/or surveillance devices, which can limit the amount of data about the obfuscated control interface and/or user interactions with the obfuscated control interface that such users and/or surveillance devices can obtain and use to try to infer the meaning of interface elements on the obfuscated control interface and data entered by the user through the obfuscated control interface.

The occlusions can include, for example and without limitations, areas, surfaces, planes, objects, and/or regions in a scene that are visible or within a field-of-view (FOV) of the user associated with the extended reality system 100 but are not visible or within the FOV of other users and/or surveillance devices in the scene and/or that are not visible through certain objects in the scene such as a window or a door. In some cases, the location/position, number, existence, and/or characteristics of detected objects, users, and/or occlusions in the physical environment can be used to determine when and/or how to render a virtual control interface as an obfuscated control interface to hide the configuration of the control interface and/or the meaning of input elements on the control interface. For example, by detecting the location/position, number, existence, and/or characteristics of detected objects, users, and/or occlusions in the physical environment, the control interface management engine 122 can determine a configuration (e.g., positioning, ordering, sizing, location, layout, etc.) of a control interface that may be more difficult for other users and/or devices to ascertain or recognize from their respective FOVs.

In some cases, when the control interface management engine 122 detects one or more objects, users, and/or occlusions in the physical environment, the control interface management engine 122 can coordinate with the XR engine 120 and/or the rendering engine 126 to render an obfuscated control interface in a manner that conceals from other users or devices the configuration of the control interface, its input elements, and/or associated user interactions to prevent the other users, devices, etc., from inferring the data entered by the user. In some examples, the control interface management engine 122 can calculate and/or determine a configuration and/or presentation of an obfuscated control interface and/or a location for rendering the obfuscated control interface. For example, the control interface management engine 122 can determine a size, orientation, location, interface design or scheme, and/or any other configuration for the obfuscated control interface. To illustrate, the control interface management engine 122 can determine a configuration of the obfuscated control interface that hides the configuration of the obfuscated control interface and/or the meaning of input elements on the obfuscated control interface from other users and/or devices. In some cases, the control interface management engine 122 can render the obfuscated control interface at least partially within an area of an occlusion and/or modify a certain position, orientation, size, layout, and/or scheme of the obfuscated control interface to hide the significance of input elements from other users and/or devices.

In some cases, the control interface management engine 122 can detect conditions and/or events that trigger an occlusion detection, an obfuscated control interface presentation, a control interface modification or configuration, etc. For example, the control interface management engine 122 can detect when certain types of data and/or interfaces should be presented as, or within, an obfuscated control interface (e.g., based on preferences, rules, type of content, scene characteristics, objects in the scene, users in the scene, etc.), when an obfuscated control interface should be removed from presentation, when an obfuscated control interface should be moved from one location to another, when an obfuscated control interface should remain locked within a location or occlusion, when an obfuscated control interface should be reconfigured (e.g., scaled, re-oriented, changed or redesigned, etc.) to maintain privacy or security protections, etc.

The image processing engine 124 can perform one or more image processing operations. In some examples, the image processing engine 124 can perform image processing operations based on data from the image sensor 102. In some cases, the image processing engine 124 can perform image processing operations such as, for example, filtering, demosaicing, scaling, color correction, color conversion, segmentation, noise reduction filtering, spatial filtering, artifact correction, etc. The rendering engine 126 can obtain image data generated and/or processed by the compute components 110, the image sensor 102, the XR engine 120, and/or the image processing engine 124 and render video and/or image frames for presentation on a display device.

While the extended reality system 100 is shown to include certain components, one of ordinary skill will appreciate that the extended reality system 100 can include more or fewer components than those shown in FIG. 1. For example, the extended reality system 100 can also include, in some instances, one or more memory devices (e.g., RAM, ROM, cache, and/or the like), one or more networking interfaces (e.g., wired and/or wireless communications interfaces and the like), one or more display devices, and/or other hardware or processing devices that are not shown in FIG. 1. An illustrative example of a computing device and hardware components that can be implemented with the extended reality system 100 is described below with respect to FIG. 11.

Figure 2:
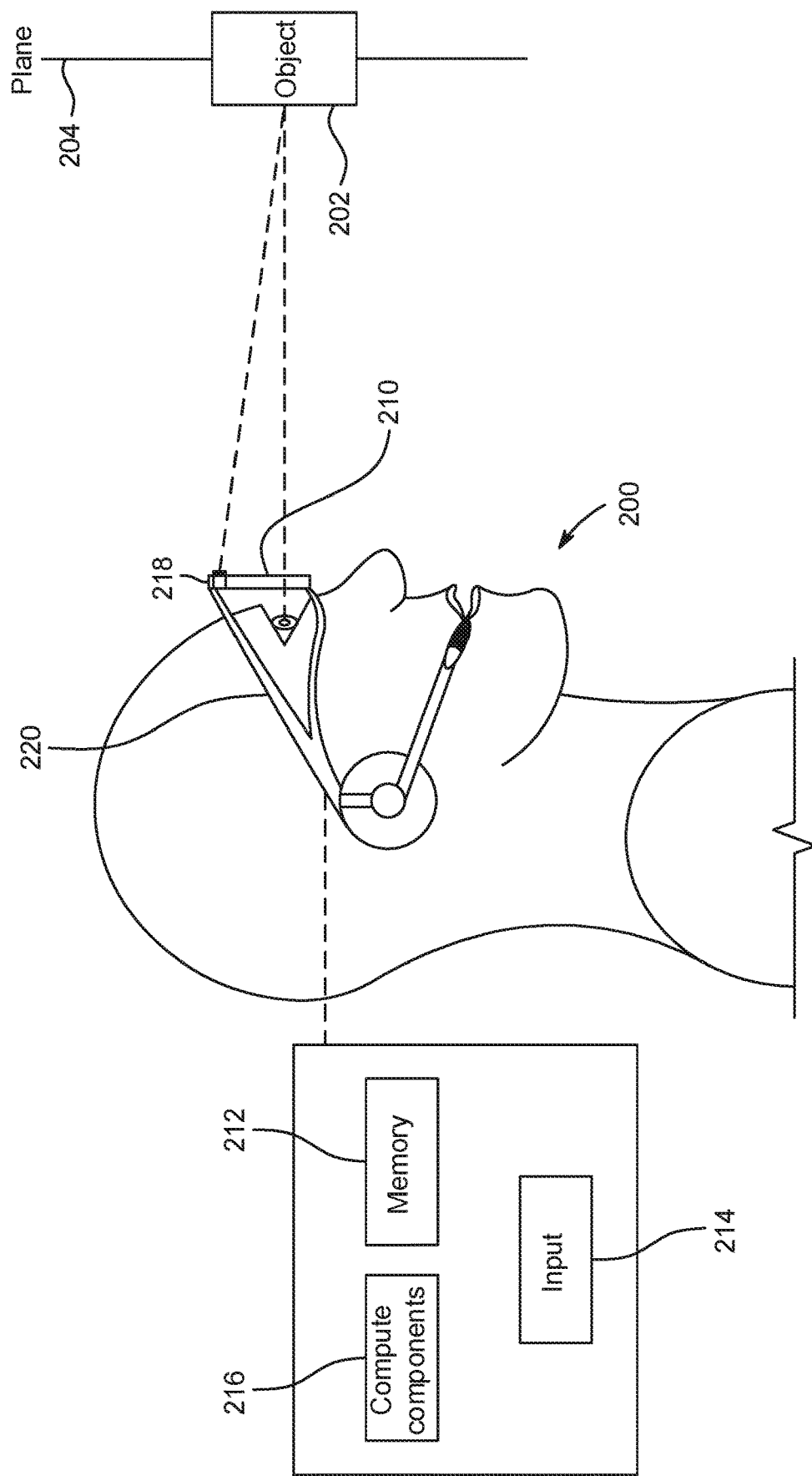
FIG. 2 is a diagram illustrating an example of an extended reality system being worn by a user, in accordance with some examples of the present disclosure.

FIG. 2 is a diagram illustrating an example of an extended reality system 220 being worn by a user 200. The extended reality system 220 can include some or all of the same components as the extended reality system 100 shown in FIG. 1 and described above, and can perform some or all of the same functions as the extended reality system 100. While the extended reality system 220 is shown in FIG. 2 as a AR glasses, the extended reality system 220 can include any suitable type of XR device, such as an HMD or other XR devices. The extended reality system 220 is described as an optical see-through AR device, which allows the user 200 to view the real world while wearing the extended reality system 220. For example, the user 200 can view an object 202 in a real-world environment on a plane 204 at a distance from the user 200. The extended reality system 220 has an image sensor 218 and a display 210 (e.g., a glass, a screen, a lens, or other display) that allows the user 200 to see the real-world environment and also allows AR content to be displayed thereon. The image sensor 218 can be similar or the same as the image sensor 102 shown in FIG. 1. While one image sensor 218 and one display 210 are shown in FIG. 2, the extended reality system 220 can include multiple cameras and/or multiple displays (e.g., a display for the right eye and a display for the left eye) in some implementations. AR content (e.g., an image, a video, a graphic, a virtual or AR object, or other AR content) can be projected or otherwise displayed on the display 210. In one example, the AR content can include an augmented version of the object 202. In another example, the AR content can include additional AR content that is related to the object 202 or related to one or more other objects in the real-world environment.

As shown in FIG. 2, the extended reality system 220 can include, or can be in wired or wireless communication with, compute components 216 and a memory 212. The compute components 216 and the memory 212 can store and execute instructions used to perform the techniques described herein. In implementations where the extended reality system 220 is in communication (wired or wirelessly) with the memory 212 and the compute components 216, a device housing the memory 212 and the compute components 216 may be a computing device, such as a desktop computer, a laptop computer, a mobile phone, a tablet, a game console, or other suitable device. The extended reality system 220 also includes or is in communication with (wired or wirelessly) an input device 214. The input device 214 can include any suitable input device, such as a touchscreen, a pen or other pointer device, a keyboard, a mouse a button or key, a microphone for receiving voice commands, a gesture input device for receiving gesture commands, any combination thereof, and/or other input device. In some cases, the image sensor 218 can capture images that can be processed for interpreting gesture commands.

The image sensor 218 can capture color images (e.g., images having red-green-blue (RGB) color components, images having luma (Y) and chroma (C) color components such as YCbCr images, or other color images) and/or grayscale images. As noted above, in some cases, the extended reality system 220 can include multiple cameras, such as dual front cameras and/or one or more front and one or more rear-facing cameras, which may also incorporate various sensors. In some cases, image sensor 218 (and/or other cameras of the extended reality system 220) can capture still images and/or videos that include multiple video frames (or images). In some cases, image data received by the image sensor 218 (and/or other cameras) can be in a raw uncompressed format, and may be compressed and/or otherwise processed (e.g., by an image signal processor (ISP) or other processor of the extended reality system 220) prior to being further processed and/or stored in the memory 212. In some cases, image compression may be performed by the compute components 216 using lossless or lossy compression techniques (e.g., any suitable video or image compression technique).

In some cases, the image sensor 218 (and/or other camera of the extended reality system 220) can be configured to also capture depth information. For example, in some implementations, the image sensor 218 (and/or other camera) can include an RGB-depth (RGB-D) camera. In some cases, the extended reality system 220 can include one or more depth sensors (not shown) that are separate from the image sensor 218 (and/or other camera) and that can capture depth information. For instance, such a depth sensor can obtain depth information independently from the image sensor 218. In some examples, a depth sensor can be physically installed in a same general location the image sensor 218, but may operate at a different frequency or frame rate from the image sensor 218. In some examples, a depth sensor can take the form of a light source that can project a structured or textured light pattern, which may include one or more narrow bands of light, onto one or more objects in a scene. Depth information can then be obtained by exploiting geometrical distortions of the projected pattern caused by the surface shape of the object. In one example, depth information may be obtained from stereo sensors such as a combination of an infra-red structured light projector and an infra-red camera registered to a camera (e.g., an RGB camera).

In some implementations, the extended reality system 220 includes one or more sensors. The one or more sensors can include one or more accelerometers (e.g., 104), one or more gyroscopes (e.g., 106), and/or other sensors. The one or more sensors can provide velocity, orientation, and/or other position-related information to the compute components 216. In some cases, the one or more sensors can include at least one inertial measurement unit (IMU). An IMU is an electronic device that measures the specific force, angular rate, and/or the orientation of the extended reality system 220, using a combination of one or more accelerometers, one or more gyroscopes, and/or one or more magnetometers. In some examples, the one or more sensors can output measured information associated with the capture of an image captured by the image sensor 218 (and/or other camera of the extended reality system 220) and/or depth information obtained using one or more depth sensors of the extended reality system 220.

The output of one or more sensors (e.g., one or more IMUs) can be used by the compute components 216 to determine a pose of the extended reality system 220 (also referred to as the head pose) and/or the pose of the image sensor 218 (or other camera of the extended reality system 100). In some cases, the pose of the extended reality system 220 and the pose of the image sensor 218 (or other camera) can be the same. The pose of image sensor 218 refers to the position and orientation of the image sensor 218 relative to a frame of reference (e.g., with respect to the object 202). In some implementations, the camera pose can be determined for 6-Degrees Of Freedom (6DOF), which refers to three translational components (e.g., which can be given by X (horizontal), Y (vertical), and Z (depth) coordinates relative to a frame of reference, such as the image plane) and three angular components (e.g. roll, pitch, and yaw relative to the same frame of reference).

In some aspects, the pose of image sensor 218 and/or the extended reality system 220 can be determined and/or tracked by the compute components 216 using a visual tracking solution based on images captured by the image sensor 218 (and/or other camera of the extended reality system 220). In some examples, the compute components 216 can perform tracking using computer vision-based tracking, model-based tracking, and/or simultaneous localization and mapping (SLAM) techniques. For instance, the compute components 216 can perform SLAM or can be in communication (wired or wireless) with a SLAM engine (now shown). SLAM refers to a class of techniques where a map of an environment (e.g., a map of an environment being modeled by extended reality system 220) is created while simultaneously tracking the pose of a camera (e.g., image sensor 218) and/or the extended reality system 220 relative to that map. The map can be referred to as a SLAM map, and can be three-dimensional (3D). The SLAM techniques can be performed using color or grayscale image data captured by the image sensor 218 (and/or other camera of the extended reality system 220), and can be used to generate estimates of 6DOF pose measurements of the image sensor 218 and/or the extended reality system 220. Such a SLAM technique configured to perform 6DOF tracking can be referred to as 6DOF SLAM. In some cases, the output of one or more sensors can be used to estimate, correct, and/or otherwise adjust the estimated pose.

In some cases, the 6DOF SLAM (e.g., 6DOF tracking) can associate features observed from certain input images from the image sensor 218 (and/or other camera) to the SLAM map. 6DOF SLAM can use feature point associations from an input image to determine the pose (position and orientation) of the image sensor 218 and/or extended reality system 220 for the input image. 6DOF mapping can also be performed to update the SLAM Map. In some cases, the SLAM map maintained using the 6DOF SLAM can contain 3D feature points triangulated from two or more images. For example, key frames can be selected from input images or a video stream to represent an observed scene. For every key frame, a respective 6DOF camera pose associated with the image can be determined. The pose of the image sensor 218 and/or the extended reality system 220 can be determined by projecting features from the 3D SLAM map into an image or video frame and updating the camera pose from verified 2D-3D correspondences.

In one illustrative example, the compute components 216 can extract feature points from every input image or from each key frame. A feature point (also referred to as a registration point) as used herein is a distinctive or identifiable part of an image, such as a part of a hand, an edge of a table, among others. Features extracted from a captured image can represent distinct feature points along three-dimensional space (e.g., coordinates on X, Y, and Z-axes), and every feature point can have an associated feature location. The features points in key frames either match (are the same or correspond to) or fail to match the features points of previously-captured input images or key frames. Feature detection can be used to detect the feature points. Feature detection can include an image processing operation used to examine one or more pixels of an image to determine whether a feature exists at a particular pixel. Feature detection can be used to process an entire captured image or certain portions of an image. For each image or key frame, once features have been detected, a local image patch around the feature can be extracted. Features may be extracted using any suitable technique, such as Scale Invariant Feature Transform (SIFT) (which localizes features and generates their descriptions), Speed Up Robust Features (SURF), Gradient Location-Orientation histogram (GLOH), Normalized Cross Correlation (NCC), or other suitable technique.

In some examples, AR (or virtual) objects can be registered or anchored to (e.g., positioned relative to) the detected features points in a scene. For example, the user 200 can be looking at a restaurant across the street from where the user 200 is standing. In response to identifying the restaurant and AR content associated with the restaurant, the compute components 216 can generate an AR object that provides information related to the restaurant. The compute components 216 can also detect feature points from a portion of an image that includes a sign on the restaurant, and can register the AR object to the feature points of the sign so that the AR object is displayed relative to the sign (e.g., above the sign so that it is easily identifiable by the user 200 as relating to that restaurant).

The extended reality system 220 can generate and display various AR objects for viewing by the user 200. For example, the extended reality system 220 can generate and display a virtual interface, such as a virtual keyboard, as an AR object for the user 200 to enter text and/or other characters as needed. The virtual interface can be registered to one or more physical objects in the real world. However, in many cases, there can be a lack of real-world objects with distinctive features that can be used as reference for registration purposes. For example, if a user is staring at a blank whiteboard, the whiteboard may not have any distinctive features to which the virtual keyboard can be registered. Outdoor environments may provide even less distinctive points that can be used for registering a virtual interface, for example based on the lack of points in the real world, distinctive objects being further away in the real world than when a user is indoors, the existence of many moving points in the real world, points at a distance, among others.

However, in some cases, the extended reality system 220 can make use of the hands of the user 200 for registering a virtual interface. For example, one or more hands and fingers of the user 200 can be used as the real world registration points for the virtual interface (e.g., to anchor the virtual interface in space). By registering the virtual interface to the hands and fingers the challenge of operating outdoors is reduced.

In some cases, the extended reality system 220 can also track the hand and/or fingers of the user 200 to allow the user 200 to control the virtual interface in the AR environment. For example, the extended reality system 220 can track a pose and/or movement of the hand and/or fingertips of the user 200 to identify or translate user interactions with the virtual interface. The user interactions can include, for example and without limitation, moving the virtual interface, resizing the virtual interface, selecting an input interface element in the virtual interface, providing an input through the virtual interface, etc.

In some examples, the image sensor 218 can capture images of the scene associated with the user 200, which the extended reality system 220 can use to detect objects and humans/faces in the scene. For example, the image sensor 218 can capture images of humans/faces and/or any objects in the scene, such as other devices (e.g., recording devices, displays, etc.), windows, doors, desks, tables, chairs, walls, etc. The extended reality system 220 can use the images to recognize the faces and/or objects captured by the images and estimate a relative location of such faces and/or objects. To illustrate, the extended reality system 220 can perform facial recognition to detect any faces in the scene and can use the images captured by the image sensor 218 to estimate a location of the faces within the scene. As another example, the extended reality system 220 can analyze images from the image sensor 218 to detect any capturing devices (e.g., cameras, microphones, etc.) or signs indicating the presence of capturing devices, and estimate the location of the capturing devices (or signs).

The extended reality system 220 can also use the images to detect any occlusions within a FOV of the user 200 that may be located or positioned such that any information rendered on a surface of such occlusions or within a region of such occlusions are not visible to, or are out of a FOV of, other detected users or capturing devices. For example, the extended reality system 220 can detect the palm of the hand of the user 200 is in front of, and facing, the user 200 and thus within the FOV of the user 200. The extended reality system 220 can also determine that the palm of the hand of the user 200 is outside of a FOV of other users and/or capturing devices detected in the scene, and thus the surface of the palm of the hand of the user 200 is occluded from such users and/or capturing devices. When the extended reality system 220 presents any AR content to the user 200 that the extended reality system 220 determines should be private and/or protected from being visible to the other users and/or capturing devices, such as an obfuscated control interface as described herein, the extended reality system 220 can render such AR content on the palm of the hand of the user 200 to protect the privacy of such AR content and prevent the other users and/or capturing devices from being able to see at least some of the AR content and/or interactions by the user 200 with that AR content and/or infer the meaning of input elements on a rendered obfuscated control interface.

Figure 3:
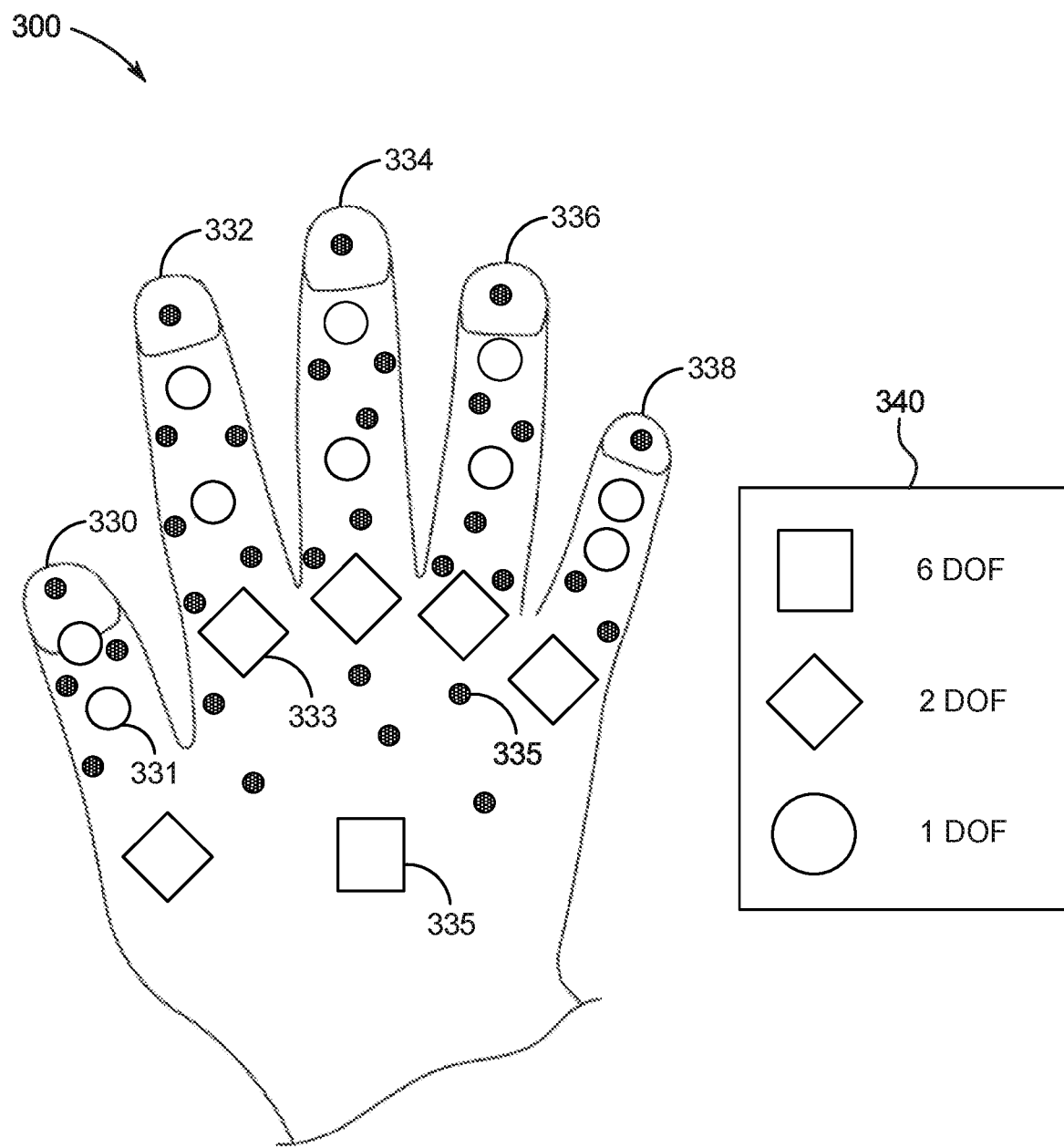
FIG. 3 is a diagram illustrating example landmark points of a hand that can be used to track positions of the hand and interactions by the hand with a virtual interface, in accordance with some examples of the present disclosure.

FIG. 3 is a diagram illustrating example landmark points of a hand 300 that can be used to track positions of the hand 300 and interactions by the hand 300 with a virtual interface, such as an obfuscated control interface as described herein. The landmark points shown in FIG. 3 correspond to different parts of the hand 300, including a landmark point 335 on the palm of the hand 300, landmark points on the thumb 330 of the hand 300, landmark points on the index finger 332 of the hand 300, landmark points on the middle finger 334 of the hand 300, landmark points on the ring finger 336 of the hand 300, and landmark points on the pinky finger 338 of the hand 300. The palm of the hand 300 can move in three translational directions (e.g., measured in X, Y, and Z directions relative to a plane, such as an image plane) and in three rotational directions (e.g., measured in yaw, pitch, and roll relative to the plane), and thus provides six degrees of freedom (6DOF) that can be used for registration and/or tracking. The 6DOF movement of the palm is illustrated as a square in FIG. 3, as indicated in the legend 340.

The different joints of the fingers of the hand 300 allow for different degrees of movement, as illustrated in the legend 340. As illustrated by the diamond shapes (e.g., diamond 333) in FIG. 3, the base of each finger (corresponding to the metacarpophalangeal joint (MCP) between the proximal phalanx and the metacarpal) has two degrees of freedom (2DOF) corresponding to flexion and extension as well as abduction and adduction. As illustrated by the circle shapes (e.g., circle 331) in FIG. 3, each of the upper joints of each finger (corresponding to the interphalangeal joints between the distal, middle, and proximal phalanges) has one degree of freedom (2DOF) corresponding flexion and extension. As a result, the hand 300 provides 26 degrees of freedom (26DOF) from which to track the hand 300 and interactions by the hand 300 with a virtual interface rendered by the extended reality system 100.

The extended reality system 100 can use one or more of the landmark points on the hand 300 to track the hand 300 (e.g., track a pose and/or movement of the hand 300) and track interactions with a virtual interface rendered by the extended reality system 100. As noted above, as a result of the detection of the one or more landmark points on the hand 300, the pose of the landmarks (and thus the hand and fingers) in relative physical position with respect to the extended reality system 100 can be established. For example, the landmark points on the palms of the hand 300 (e.g., the landmark point 335) can be detected in an image, and the locations of the landmark points can be determined with respect to the image sensor 102 of the extended reality system 100. A point of a virtual interface (e.g., a center point, such as a center of mass or other center point) rendered by the extended reality system 100 and/or an interface element on the virtual interface selected by the hand 300, or with which the hand 300 has interacted, can be translated to a position on the display 210 (or a rendering on the display 210) of the extended reality system 100 relative to the locations determined for the landmark points on the palms of the hand 300. In some examples, a point of a portion of the virtual interface with which the hand 300 has interacted with can be registered relative to locations of one or more landmark points on the hand 300.

In some examples, the extended reality system 100 can also register the virtual interface and/or the hand 300 to points in the real world (as detected in one or more images) and/or to other parts of the user. For instance, in some implementations, in addition to determining a physical pose of the hand 300 with respect to the extended reality system 100 and/or a virtual interface, the extended reality system 100 can determine the location of other landmarks, such as distinctive points (referred to as key points) on walls, one or more corners of objects, features on a floor, points on a human face, points on nearby devices, among others. In some cases, the extended reality system 100 can place the virtual interface within a certain position with respect to key points detected in the environment, which can correspond to, for example, detected objects and/or humans in the environment.

In some examples, the pose of the extended reality system 100 (and/or the head of the user 200) can be determined using, for example, image data from the image sensor 102 and/or measurements from one or more sensors such the accelerometer 104, the gyroscope 106, and/or one or more other sensors (e.g., one or more magnetometers, one or more inertial measurement units (IMUs), etc.). The head pose can be used to determine a position of the virtual interface, the hand 300, and/or objects and/or humans in the environment.

In some examples, the virtual interface can be maintained at a rendered position. The user can then virtually interact with the virtual interface as the virtual interface is rendered at the determined position. For example, the virtual interface can be maintained at a rendered position and the user can virtually enter text through the virtual interface. In some cases, the virtual interface can stay fixed as the user interacts with the virtual interface. In some cases, the virtual interface can be maintained at the determined position until a re-registration event is detected by the extended reality system 100. If the virtual interface is an obfuscated control interface, the extended reality system 100 can move, remove, or reconfigure the virtual interface if it detects an event indicating that the virtual interface may be within a FOV of another user or a risk object, which can include any object that can record the virtual interface (and/or associated interactions) or enable users to see the virtual interface from or through the risk object such as a recording device, a window, a glass, door, etc. For example, the extended reality system 100 can move the virtual interface to a different location that the extended reality system 100 determines is outside of the FOV of the other user or risk object. If the extended reality system 100 determines that there are no other locations (or is unable to identify other locations) that are within a FOV of the user 200 but outside of the FOV of the other user or risk object, the extended reality system 100 can change other aspects of the virtual interface, such as a size or layout; notify the user that the virtual interface is no longer private; prompt the user to select whether to leave the virtual interface as currently rendered; move the virtual interface to a different location; remove the virtual interface; change a design scheme of the virtual interface; and/or perform another action.

Figure 4:
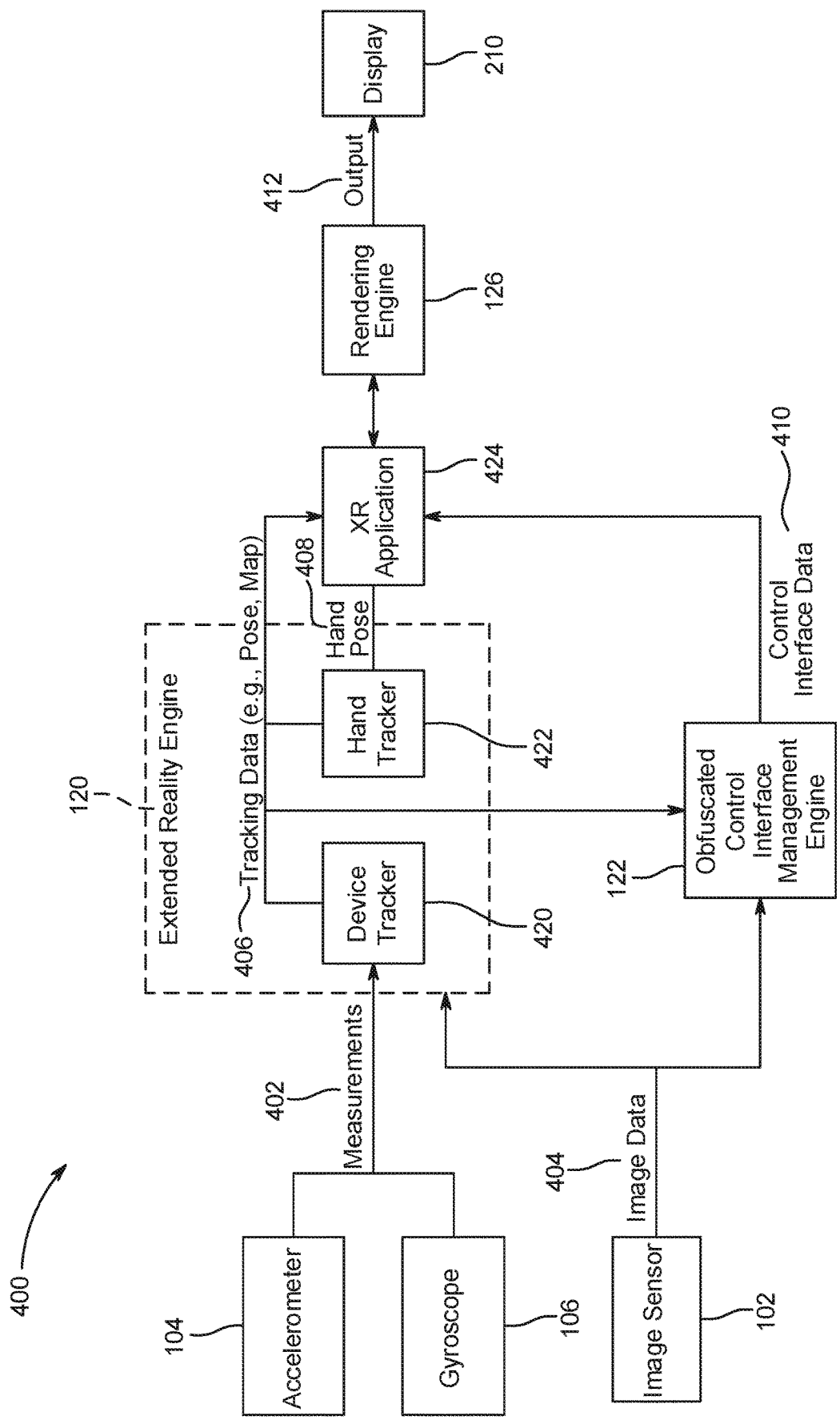
FIG. 4 is a diagram illustrating an example system flow for generating obfuscated control interfaces for extended reality experiences, in accordance with some examples of the present disclosure.

FIG. 4 is a diagram illustrating an example system flow 400 for generating obfuscated control interfaces for XR experiences. The obfuscated control interfaces can be generated to allow a user to interact with a control interface while preventing other users and recording devices from interpreting/recognizing the control interface, the meaning of input elements on the control interface, the meaning of the user's interactions with the control interface, and/or the data associated with such user interactions.

In this example, a device tracker 420 can receive measurements 402 from accelerometer 104 and gyroscope 106, and image data 404 from image sensor 102. In some examples, the measurements 402 can include motion measurements from the accelerometer 104 and orientation measurements from the gyroscope 106. For example, the measurements 402 can include one or more translational vectors (e.g., up/down, left/right, forward/back) from the accelerometer 104 and one or more rotational vectors (e.g., pitch, yaw, roll) from the gyroscope 106. Moreover, the image data 404 can include one or more images or frames captured by the image sensor 102. The one or more images or frames can capture a scene associated with the extended reality system 100 and/or one or more portions of the scene (e.g., one or more regions, objects, humans, etc.).

The device tracker 420 can be a tracking component implemented by the extended reality system 100. In some examples, the device tracker 420 can be part of, or implemented by the XR engine 120 on the extended reality system 100. In other examples, the device tracker 420 can be separate from the XR engine 120 and implemented by one or more of the compute components 110 on the extended reality system 100.

The device tracker 420 can use the measurements 402 and image data 404 to track a pose (e.g., a 6DOF pose) of the extended reality system 100. For example, the device tracker 420 can fuse visual data from the image data 404 with inertial data from the measurements 402 to determine a position and motion of the extended reality system 100 relative to the physical world (e.g., the scene) and a map of the physical world. In some examples, when tracking the pose of the extended reality system 100, the device tracker 420 can generate a three-dimensional (3D) map of the scene (e.g., the real world) and/or generate updates for a 3D map of the scene. The 3D map updates can include, for example and without limitation, new or updated features and/or landmark points associated with the scene and/or the 3D map of the scene, localization updates identifying or updating a position of the extended reality system 100 within the scene and the 3D map of the scene, etc. The 3D map can provide a digital representation of a scene in the real/physical world. In some examples, the 3D map can anchor location-based objects and/or content to real-world coordinates and/or objects. The extended reality system 100 can use a mapped scene (e.g., a scene in the physical world represented by, and/or associated with, a 3D map) to merge the physical and virtual worlds and/or merge virtual content or objects with the physical environment.

The device tracker 420 can provide tracking data 406 generated from the measurements 402 and the image data 404 to a hand tracker 422, an XR application 424, and the control interface management engine 122. The tracking data 406 can include the pose of the extended reality system 100 and map data calculated by the device tracker 420. The map data can include a 3D map of the scene and/or map updates for a 3D map of the scene, as previously described.

The hand tracker 422 can be a component implemented by the extended reality system 100 to track a hand (e.g., 300) of the user (e.g., 200) associated with the extended reality system 100 and/or fingertips in the hand of the user, as previously explained. For simplicity and explanation purposes, the hand tracker 422 will be described herein as a component for tracking hands. However, it should be noted that, in other examples, the hand tracker 422 can track other objects and/or body parts. For example, as previously noted, the hand tracker 422 can track fingers or fingertips on a hand either in addition to, or instead of, tracking the hand itself.

In some examples, the device tracker 420 can be part of, or implemented by, the XR engine 120 on the extended reality system 100. In other examples, the device tracker 420 can be separate from the XR engine 120 and implemented by one or more of the compute components 110 on the extended reality system 100.

The hand tracker 422 can also receive the image data 404 from the image sensor 102. The hand tracker 422 can use the image data 404 and the tracking data 406 to track a hand pose 408 (e.g., a pose of the hand and/or fingers/fingertips of the hand). In some examples, the hand tracker 422 can determine the hand pose 408 as previously described with respect to FIG. 3. The hand tracker 422 can then provide the hand pose 408 to the XR application 424. In some examples, the XR application 424 can be an application on the extended reality system 100 designed and/or configured to provide a particular XR experience, such as, for example, an AR gaming experience, an AR classroom experience, and/or any other XR experiences. The XR application 424 can be part of, or implemented by, the XR engine 120 or can be separate from the XR engine 120.

The control interface management engine 122 can use the image data 404 and the tracking data 406 to determine when, how, and/or where to render an obfuscated control interface as part of an XR experience. The obfuscated control interface can be a virtual control interface designed and/or configured to hide the control interface, the configuration of the control interface, the meaning of input elements on the control interface, interactions between the user and the control interface, and/or data inputs/outputs associated with the control interface from any users and/or recording devices in a scene that are not authorized to see such information, and/or all users and/or recording devices in the scene other than the intended user associated with the extended reality system 100.

In some examples, the control interface management engine 122 can determine whether a virtual control interface should be rendered as an obfuscated control interface in order to hide the configuration of the virtual control interface and associated input elements and input data from users and/or recording devices in the scene. The control interface management engine 122 can determine whether to render the virtual control interface as an obfuscated control interface based on one or more factors, such as, for example, user preferences, system preferences, application preferences, the type of interface of the virtual control interface (e.g., a password prompt, a pin pad, a medical form, an exam or quiz question, a voting poll, a banking interface, a private form, a competitive game control interface, etc.), the type of data inputs/outputs associated with the virtual interface (e.g., medical data, financial data, authentication credentials, confidential data, personal or private data, protected data, security information, sensitive data, etc.), security information or access levels associated with the virtual interface and/or associated data, the type of application associated with the virtual interface (e.g., banking, medical, security, gaming, etc.), the current environment associated with the extended reality system 100 (e.g., public area, surveilled area, high-crime area, populated area, area with nearby users or devices, etc.), and/or any other factors.

In some cases, the control interface management engine 122 can determine a configuration (e.g., size, position, ordering, design scheme or layout, location, etc.) of the obfuscated control interface and/or interface elements of the obfuscated control interface.

For example, when presenting a multi-option selection object that allows a user to select different options based on different swipes (e.g., left swipe for one option and right swipe for another option), the control interface management engine 122 can determine a randomized or modified ordering of the various options and/or associated swipe actions. In a multi-option selection via a virtual button press, the control interface management engine 122 can determine a randomized or modified ordering of the options to obfuscate their significance. As another example, in a virtual keyboard presentation, the control interface management engine 122 can determine a random or different resizing and repositioning of the keyboard (and/or keyboard inputs) at certain times and/or events (e.g., on each button press).

In some cases, the control interface management engine 122 can determine a configuration of a virtual interface where a fake, decoy, or non-functional interface element is introduced which obfuscates the layout of the virtual interface and/or associated input elements, the size of the virtual interface and/or associated input elements, the position of the virtual interface and/or associated input elements, the length or size of entered text, etc. The control interface management engine 122 can determine specific times, events, and/or intervals when to present such fake, decoy, or non-functional interface element and/or switch between presenting fake, decoy, or non-functional interface elements. In some examples, the control interface management engine 122 can modify or randomize the order or configuration of predictive text rendered based on typed text.

In some cases, the control interface management engine 122 can identify a private region in the scene where the obfuscated control interface can be rendered. The private region can include a region, area, location, object, surface, and/or plane in the scene that is within the FOV of the user associated with the extended reality system 100 but outside of a FOV of other users and/or any known or potential recording devices in the scene. In other words, the private region can be somewhere in the scene that the user can see but other users and/or recording devices in the scene cannot see. In some cases, the private region can be determined to be outside of a FOV of other users and/or recording devices if an occlusion in the scene can prevent (e.g., block) the other users and/or recording devices from seeing the private region.

For example, a stack of books on a table may block other users and/or recording devices in a scene from seeing an area of the table on a specific side of the stack of books (e.g., an opposite side relative to the other users and/or recording devices). If that area of the table is not occluded from the user (e.g., is within a FOV of the user) associated with the extended reality system 100, the stack of books can be deemed an occlusion and the area of the table can be treated as a private region which can be used to render the private control interface for the user without exposing at least some of the obfuscated control interface and/or associated interactions/data to the other users and/or recording devices in the scene. By preventing at least some portions of the obfuscated control interface and/or associated interactions from being visible to other users or devices in the physical environments, it can be more difficult to analyze user interactions and infer the meaning of associated input elements from the obfuscated control interface and/or associated data inputs.

In some examples, to identify a private region in the scene, the control interface management engine 122 can use the image data 404 to identify any objects and faces in the scene and their associated location in the scene relative to the extended reality system 100. The objects can include risk objects. Risk objects can include any devices with recording capabilities, such as a camera, or anything that would allow other users to see the private region, such as a window, an open or glass door, etc. In some cases, the control interface management engine 122 can use the information about the objects and/or faces in the scene and their associated locations within the scene to determine whether any region, area, location, object, surface, and/or plane in the scene can be selected as a private region that is outside of a FOV of the other users and/or risk objects but within a FOV of the user associated with the extended reality system 100. For example, the control interface management engine 122 can determine if there is any area or plane in the scene within a relative location, angle, distance, etc., that would prevent the other users and/or risk objects from seeing that area or plane. In some examples, the control interface management engine 122 can use such information to determine a configuration for the obfuscated control interface based on what portions or aspects of the interface may be visible to other users and/or risk objects.

In some cases, the control interface management engine 122 can identify any objects and faces in the scene (and their associated location) based on inputs from the user and/or other devices. For example, the user can input information about any users and objects in the scene, including, for example, a description of such users and objects, a description of the location of such users and objects, an indication of possible occlusions and/or private regions, etc. As another example, such information can be self-reported from other devices in the scene. If such devices are trusted, the control interface management engine 122 can rely on such information when identifying objects, faces, and associated locations.

In some cases, the control interface management engine 122 can perform an occlusion calculation to determine whether there are any occlusions that would prevent other users and/or risk objects in the scene from seeing a particular region, area, location, object, surface, and/or plane in the scene. For example, the control interface management engine 122 can determine whether there are any regions in the mapped scene (e.g., a scene in the physical world represented by, and/or associated with, a 3D map) that are occluded from all but the user associated by the extended reality system 100. In some examples, the control interface management engine 122 can use ray tracing to find occlusions and/or regions in the scene occluded from other users and/or risk objects. In other examples, the control interface management engine 122 can analyze the image data 404 to determine whether there are any occlusions in the scene that may prevent other users and/or risk objects from seeing a particular region in the scene. The occlusions can include any objects or obstructions to the FOV of other users and/or risk objects in the scene. Moreover, the occlusions can be used to identify a private region that can be used to render the obfuscated control interface for the user.

In some examples, the control interface management engine 122 may infer or assume that a surface in the scene is a private region if that surface faces the user associated with the extended reality system 100 within a particular angle. For example, the private control interface management engine 122 can identify planar surfaces in the scene which face the user to within a programmable angle, and infer or assume that such planar surfaces are private. The programmable angle can be, for example, an angle within a threshold difference or distance (e.g., angular) from an angle or orientation of the face of the user. For example, if the face of the user is at a 90 degree angle, the programmable angle can be a 90 degree angle or an angle within x degrees from 90 degrees. In some cases, the control interface management engine 122 can use plane segmentation (e.g., via random sample consensus (RANSAC), Hough transform, neural network, etc.) on the mapped scene to find the planar surfaces facing the user within a programmable angle. In some examples, the control interface management engine 122 can analyze detected objects, faces, and/or occlusions, as previously described, to confirm that the planar surface is indeed private.

As previously noted, the control interface management engine 122 can determine a configuration (e.g., size, shape angle, design, scheme, etc.) of the obfuscated control interface to hide the meaning of input elements in the obfuscated control interface and/or fit and/or align the obfuscated control interface on or within a private region. For example, the control interface management engine 122 can determine a size, orientation, shape and/or layout, and/or design scheme of the obfuscated control interface determined to hide the meaning of input elements from other users and/or risk objects and/or fit the obfuscated control interface within a private region.

Next, the control interface management engine 122 can provide control interface data 410 to the XR application 424. The control interface data 410 can include an indication of a configuration of an obfuscated control interface and/or associated interface elements the XR application 424 can use to render the obfuscated control interface. In some cases, the control interface data 410 can include information about detected objects, users, occlusions, private regions, etc., in the physical environment, which the XR application 424 can also use to render the obfuscated control interface. In some examples, the control interface data 410 can include an indication of a location and configuration (e.g., shape, size, angle, ordering, layout, design scheme, etc.) of the obfuscated control interface and/or associated interface elements.

As previously explained, the XR application 424 can also receive the tracking data 406 from the device tracker 420 and the hand pose 408 from the hand tracker 422. The XR application 424 can use the tracking data 406 and the hand pose 408 along with the control interface data 410 to size, position, align, configure and render the obfuscated control interface. The rendering of the obfuscated control interface can include providing a virtual/digital overlay of the obfuscated control interface on a region of the physical environment and/or rendering/display of the obfuscated control interface to appear to a user viewing the obfuscated control interface from/through the extended reality system 100 as if located, presented, or projected on the region in the physical environment. In some cases, the XR application 424 can use the tracking data 406, the hand pose 408, and the control interface data 410 to map the obfuscated control interface to the region on a 3D map of the scene. Moreover, in some cases, the XR application 424 can use the tracking data 406, the hand pose 408, and the control interface data 410 to map and/or translate user interactions (e.g., via the hand) with the obfuscated control interface and/or otherwise allow the obfuscated control interface to interact with the user.

The XR application 424 can provide an output 412 to a display 210, which can present the obfuscated control interface to the user. The output 412 can include a rendering of the obfuscated control interface within a region. For example, the output 412 can include a virtual/digital overlay of the obfuscated control interface on (e.g., rendered on, appearing on, anchored to, locked on, etc.) the region. In some cases, the output 412 can include rendering/displaying the obfuscated control interface to appear to a user viewing the obfuscated control interface from/through the extended reality system 100 as if the obfuscated control interface is located, presented, or projected on the region. In some cases, the output 412 can include other information associated with the obfuscated control interface and/or XR content provided by the XR application 424.

Figure 5:
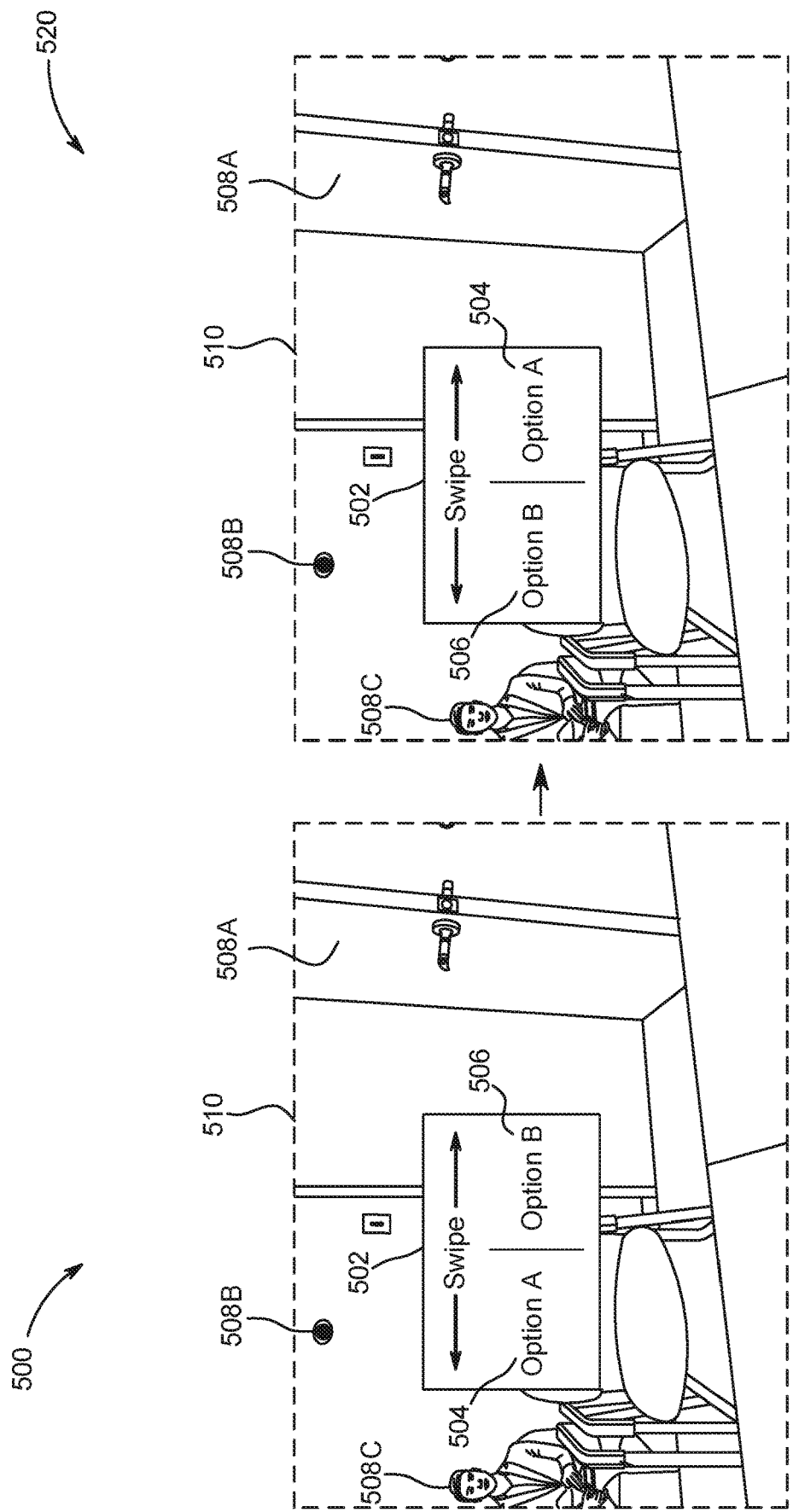
FIG. 5 illustrates an example obfuscated virtual control interface use case, in accordance with some examples of the present disclosure.

FIG. 5 illustrates an example obfuscated virtual control interface use case. The obfuscated virtual control interface use case includes an obfuscated virtual control interface 502 rendered by the extended reality system 100 within a scene 510 in the real/physical world. In this example, the obfuscated virtual control interface 502 presents selectable options 504 and 506 to the user. Moreover, the obfuscated virtual control interface 502 is shown according to a first configuration 500 and according to a second configuration 520.

In the first configuration 500, the user can swipe left to select option 504 of a virtual control interface 502 or swipe right to select option 506 of the virtual control interface 502. In the second configuration 520, the user can swipe left to select option 506 or swipe right to select option 504. Thus, the ordering of the options 504 and 506 and/or the swiping actions defined for selecting the options 504 and 506 have been modified between the first configuration 500 and the second configuration 520. The extended reality system 100 can vary the configuration of the obfuscated virtual control interface 502 according to the first configuration 500 and the second configuration 520 to conceal the configuration used to render the obfuscated virtual control interface 502 at any given time, and thereby prevent risk objects (e.g., recording devices, windows, glass doors, etc.) and/or users in the scene 510 with a potential ability to see the region within the scene 510 where the obfuscated virtual control interface 502 is virtually mapped/located, from interpreting/inferring the configuration of the obfuscated virtual control interface 502, the meaning of elements (e.g., options 504 and 506) presented in the obfuscated virtual control interface 502, and/or the meaning of user interactions with the obfuscated virtual control interface 502.

For example, in scene 510, the obfuscated virtual control interface 502 is within a FOV of another user 508C and risk objects 508A, 508B. In this example, risk object 508A is an open door, which may allow other users and/or recording devices to view the obfuscated virtual control interface 502 from outside of the open door, and risk object 508B is a recording device, such as a camera. Since the obfuscated virtual control interface 502 is within the FOV of the user 508C and the risk objects 508A, 508B, user interactions with the obfuscated virtual control interface 502 can be visible to the user 508C and risk objects 508A, 508B. The user 508C may thus be able to view and study the user interactions with the obfuscated virtual control interface 502, and the risk objects 508A, 508B may be able to record the user interactions with the obfuscated virtual control interface 502, which can allow users or devices to view and study the user interactions with the obfuscated virtual control interface 502. By analyzing user interactions with the obfuscated virtual control interface 502

If the extended reality system 100 renders the obfuscated virtual control interface 502 with a same configuration every time (or with a high frequency), a user and/or device may be able to analyze user interactions with the obfuscated virtual control interface 502 to identify characteristics and/or patterns in the user interactions, which can be used to identify/infer a configuration of the obfuscated virtual control interface 502, a meaning of input elements in the obfuscated virtual control interface 502, and/or a meaning of the user interactions with the obfuscated virtual control interface 502. The information regarding the configuration of the obfuscated virtual control interface 502, the input elements in the obfuscated virtual control interface 502, and/or the user interactions with the obfuscated virtual control interface 502 can reveal some or all of the data provided by the user through the obfuscated virtual control interface 502.

However, by varying the configuration of the obfuscated virtual control interface 502 as shown in the first configuration 500 and second configuration 520, the extended reality system 100 can prevent, or reduce the likelihood, of other users or devices identifying/inferring the configuration of the obfuscated virtual control interface 502, the meaning of input elements (e.g., options 504 and 506) in the obfuscated virtual control interface 502, and user interactions with the obfuscated virtual control interface 502. For example, varying the configuration of the obfuscated virtual control interface 502 can prevent, or reduce the likelihood, of other users and/or devices identifying the location and/or meaning of input elements in the obfuscated virtual control interface 502, the meaning of user interactions with the obfuscated virtual control interface 502, and/or patterns in user interactions with the obfuscated virtual control interface 502. With less information about the location and/or meaning of input elements in the obfuscated virtual control interface 502, the meaning of user interactions with the obfuscated virtual control interface 502, and/or patterns in user interactions with the obfuscated virtual control interface 502, it can be increasingly difficult or even impossible to identify data provided by a user through user interactions with the obfuscated virtual control interface 502. In this way, the privacy and security of user data provided through the obfuscated virtual control interface 502 can be protected.

In some cases, the extended reality system 100 can randomly vary when to render the obfuscated virtual control interface 502 according to the first configuration 500 and the second configuration 520. In other cases, the extended reality system 100 can render the obfuscated virtual control interface 502 according to the first configuration 500 a certain percentage of times and the second configuration 520 a certain percentage of times, or can vary when to render the obfuscated virtual control interface 502 according to the first configuration 500 and the second configuration 520 based on a certain sequence. For example, the extended reality system 100 can render the obfuscated virtual control interface 502 according to the first configuration 500 in forty (40) percent of the total instances it renders the obfuscated virtual control interface 502 and according to the second configuration 520 in sixty (60) percent of the total instances.

In another example, every n number of times the extended reality system 100 renders the obfuscated virtual control interface 502, the extended reality system 100 can change the ratio/percentage of times it uses the first configuration 500 and the second configuration 520 to render the obfuscated virtual control interface 502. In some cases, the extended reality system 100 can implement more layers of randomness/variation in the rendering of the obfuscated virtual control interface 502. For example, in some cases, the n number can define an interval for changing the ratio/percentage of renderings according to the first configuration 500 and the second configuration 520. To illustrate, if n represents the number ten (10), the extended reality system 100 in the previous example can change the ratio/percentage of renderings (of the obfuscated virtual control interface 502) according to the first configuration 500 and the second configuration 520 every ten times it renders the obfuscated virtual control interface 502. However, in other illustrative examples, n can represent a sequence such as ten-twenty-fifteen (10-20-15). In this example, the sequence n would provide for changing the ratio/percentage of renderings according to the first configuration 500 and the second configuration 520 after ten renderings, then again after twenty renderings, then again after fifteen renderings, etc. This can provide further layers of variation to the configuration used for rendering the obfuscated virtual control interface 502, which in some cases can provide additional protection for the user's data.

Figure 6:
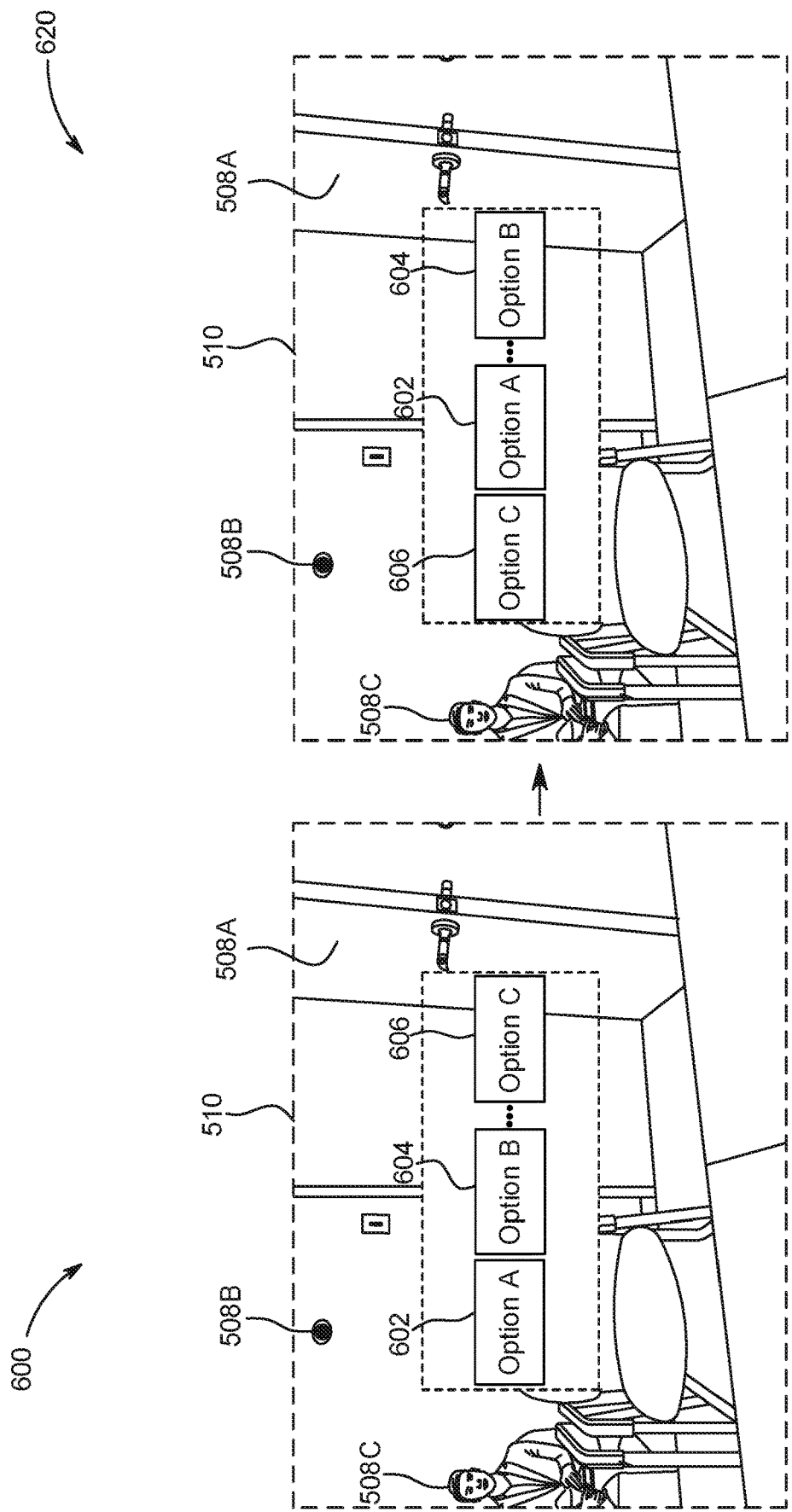
FIG. 6 illustrates an example use case for obfuscating virtual options rendered by an extended reality system by varying an ordering of the virtual options, in accordance with some examples of the present disclosure.

FIG. 6 illustrates an example use case for obfuscating virtual options 602-606 rendered by the extended reality system 100 by varying an ordering of the virtual options 602-606. In this example, the virtual options 602-606 are shown according to a first ordering 600 and a second ordering 620. The virtual options 602-606 can include selectable options provided by the extended reality system 100 to a user for selection.

In the first ordering 600, the virtual option 602 is rendered to the left of virtual options 604 and 606, virtual option 604 is rendered between (e.g., in the middle) virtual options 602 and 606, and virtual option 606 is rendered to the right of virtual options 602 and 604. By contrast, in the second ordering 620, the virtual option 606 is rendered to the left of virtual options 602 and 604, virtual option 602 is rendered between virtual options 606 and 604, and virtual option 604 is rendered to the right of virtual options 606 and 602. Thus, in the orderings 600 and 620, the extended reality system 100 has changed the ordering and location of the virtual options 602-606 rendered for the user. The extended reality system 100 can vary when the virtual options 602-606 are rendered according to the first ordering 600 and the second ordering 620 to conceal the location of the virtual options 602-606 at any given time, and thereby prevent risk objects and/or users in the scene 510 with a potential ability to see the region within the scene 510 where the virtual options 602-606 are virtual mapped/located from interpreting/inferring the configuration of the location within the scene 510 where the virtual options 602-606 appear, the meaning of the virtual options 602-606, and/or the meaning of user interactions with any of the virtual options 602-606.

For example, by varying the ordering/locations of the virtual options 602-606 as shown in the first ordering 600 and second ordering 620, the extended reality system 100 can prevent, or reduce the likelihood, of other users or devices with visible access to the location in the physical world associated with the virtual options 602-606 and/or user interactions with the virtual options 602-606 from identifying/inferring the location of the virtual objects 602-606 and the meaning of user interactions with the virtual options 602-606 (and/or with locations in the physical world corresponding to the virtual options 602-606). With less information about the location of the virtual options 602-606, the meaning of user interactions with the virtual options 602-606, patterns in user interactions with the virtual options 602-606, etc., it can be increasingly difficult or even impossible to identify data provided by a user through user interactions with the virtual options 602-606. In this way, the privacy and security of user data provided through the virtual options 602-606 can be protected.

In some cases, the extended reality system 100 can vary the ordering/location of some of the virtual options 602-606. In some cases, the extended reality system 100 can vary the ordering/location of all the virtual options 602-606. Moreover, in some examples, the extended reality system 100 can randomly vary when to render the virtual options 602-606 according to the first ordering 600 and the second ordering 620. In other cases, the extended reality system 100 can render the virtual options 602-606 according to the first ordering 600 a certain percentage of times and the second ordering 620 a certain percentage of times, or can vary when to render the virtual options 606-606 according to the first ordering 600 and the second ordering 620 based on a certain sequence, as previously described with respect to FIG. 5.

In some examples, the extended reality system 100 can also vary the relative distance, position and/or size of the virtual options 602-606. For example, in addition to, or instead of, varying the relative location of the virtual options 602-606, the extended reality system 100 can vary the relative distance between the virtual options 602-606, the relative position of the virtual options 602-606 and/or the relative size of the virtual options 602-606. This can further obscure the relative location of the virtual options 602-606 and prevent other users or devices from inferring the meaning of user interactions with the virtual options 602-606 and associated data.

Figure 7:
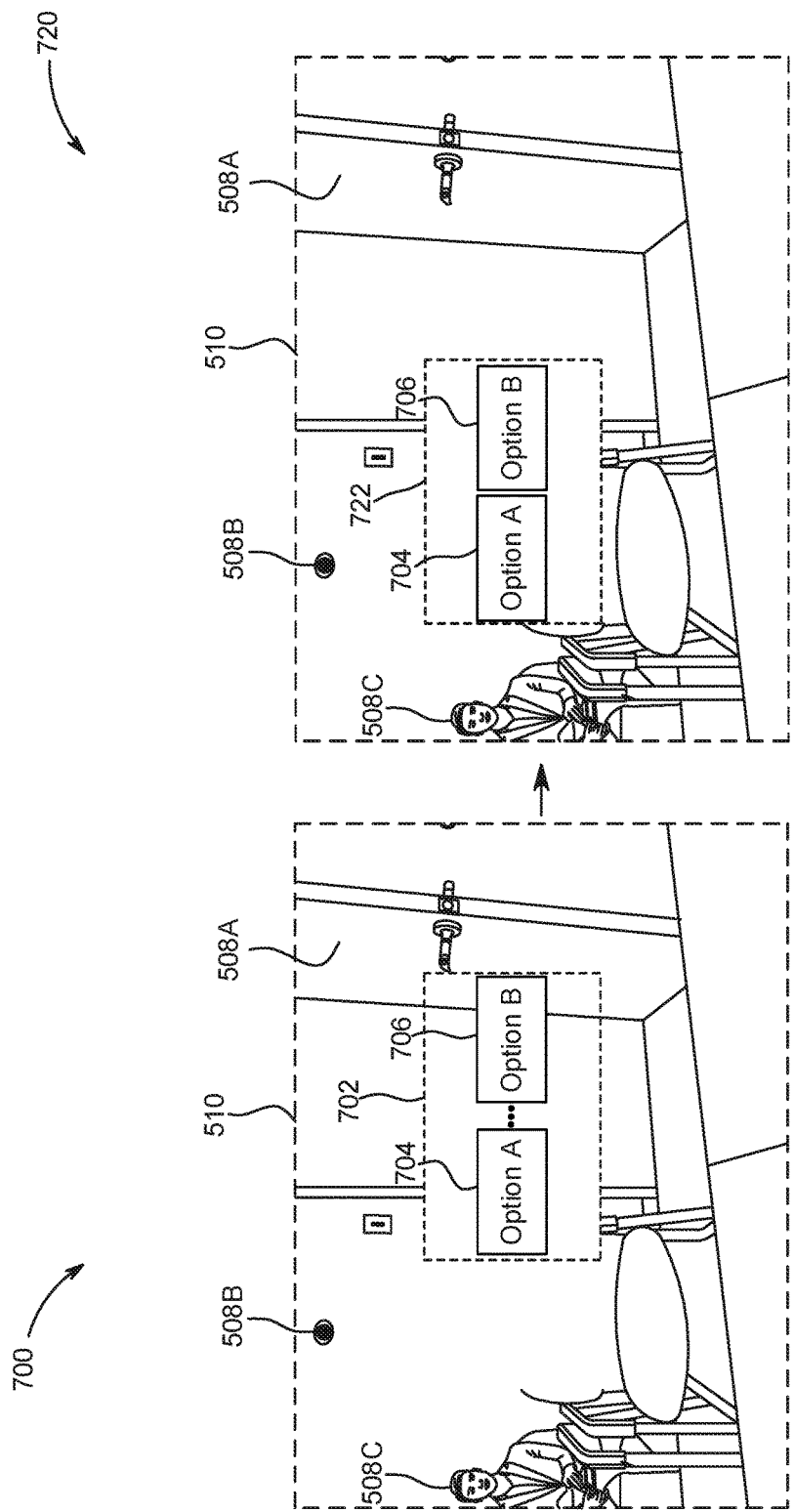
FIG. 7 illustrates an example use case for obfuscating virtual options rendered by an extended reality system by varying a position of the virtual options, in accordance with some examples of the present disclosure.

For example, with reference to FIG. 7, in a first configuration 700, the extended reality system 100 can render virtual options 704 and 706 within a presentation region 722. However, in the second configuration 720, the extended reality system 100 has changed the presentation region 722 used to render the virtual options 704 and 706. Here, the presentation region 722 has shifted relative to the presentation region 702 in the first configuration 700, causing the virtual option 706 to be rendered in configuration 720 at a same position as virtual option 704 in the first configuration 700. Thus, while the extended reality system 100 has not changed the ordering of the virtual options 704-706 in the first configuration 700 and the second configuration 720, the extended reality system 100 has repositioned the virtual options 704-706 so two different virtual options are rendered at a same location on different instances. Thus, the meaning of user interactions associated with the location/position of virtual option 704 in the first configuration 700 and virtual option 706 in the second configuration 720 has flipped/rotated between the virtual option 704 and the virtual option 706, which can obscure the meaning of user interactions with the virtual options 704 and 706.

Figure 8:
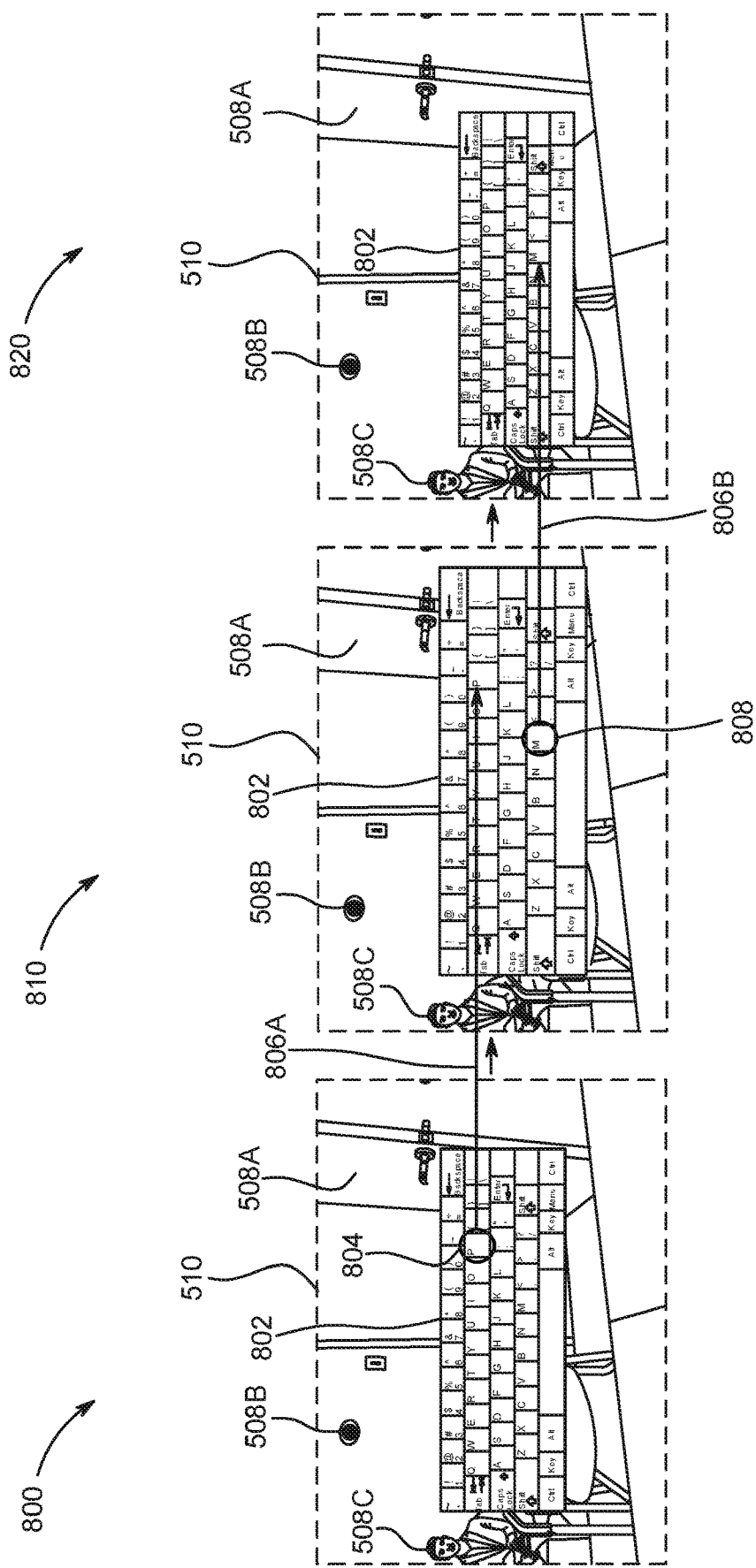
FIGS. 8 and 9 illustrate example obfuscated virtual control interface use cases involving a virtual keyboard, in accordance with some examples of the present disclosure.

FIG. 8 illustrates an example obfuscated virtual control interface use case involving a virtual keyboard 802. In this example, the virtual keyboard 802 is shown according to a first configuration 800, a second configuration 810, and a third configuration 820. Here, the size and position of the virtual keyboard 802 has changed in the first configuration 800, the second configuration 810, and the third configuration 820. The change in the size and position of the virtual keyboard 802 can also vary the relative location of virtual keys in the virtual keyboard 802 between the first configuration 800, the second configuration 810, and the third configuration 820. Thus, by varying the configuration of the virtual keyboard 802 as shown in the first configuration 800, the second configuration 810, and the third configuration 820 (as opposed to using the same configuration each time the virtual keyboard 802 is rendered), the extended reality system 100 can obscure the location of virtual keys from other users and devices, as well as meaning of user interactions with the virtual keyboard 802 and data entered by the user associated with the extended reality system 100 through the user interactions with the virtual keyboard.

In some cases, to maintain some continuity between selections of virtual keys (e.g., so a different virtual key does not appear under the user's finger after selecting a specific virtual key), when the extended reality system 100 resizes and/or repositions the virtual keyboard 802, the extended reality system 100 can maintain some consistency and/or directionality of a virtual key before and after such virtual key is selected by the user. For example, after a user selects virtual key 804 from the virtual keyboard 802 in the first configuration 800, the extended reality system 100 can resize and reposition the virtual keyboard 802 according to the second configuration 810 to vary the location of one or more virtual keys in the virtual keyboard 802 (and user interactions with the virtual keys) before and after the user selects the virtual key 804 (e.g., to vary the location between the first configuration 800 and the second configuration 810). However, the extended reality system 100 can project (shown as projection 806A) the position of the virtual key 804 pressed during the first configuration 800 so it appears at a same position in a subsequent rendering of the virtual keyboard 802 according to the second configuration 810.

This way, while the size and position of the virtual keyboard 802 has changed in the second configuration 810 after the user pressed/selected the virtual key 804 in the first configuration 800, the virtual key 804 can remain at a same position when rendered on the virtual keyboard 802 in the second configuration 810. If the user's finger used to select the virtual key 804 in the first configuration 810 remains in the same position after the virtual keyboard is presented according to the second configuration 810, the user's finger will remain at the same position of the virtual key 804 in the second configuration 810 to provide the user a level of continuity even though the size and position of the virtual keyboard 802 has changed, as well as the size and position of other virtual keys in the virtual keyboard 802.

After the user selects virtual key 808 from the virtual keyboard 802 in the second configuration 810, the extended reality system 100 can resize and reposition the virtual keyboard 802 according to the third configuration 820 to vary the location of one or more virtual keys in the virtual keyboard 802 (and user interactions with the virtual keys) before and after the user selects the virtual key 808 (e.g., to vary the location between the second configuration 810 and the third configuration 820). However, the extended reality system 100 can similarly project (shown as projection 806B) the position of the virtual key 808 pressed during the second configuration 810 so it appears at a same position in a subsequent rendering of the virtual keyboard 802 according to the third configuration 820.

Again, this way, while the size and position of the virtual keyboard 802 has changed in the third configuration 820 after the user pressed/selected the virtual key 808 in the second configuration 810, the virtual key 808 can remain at a same position when rendered on the virtual keyboard 802 in the third configuration 820. If the user's finger used to select the virtual key 808 in the second configuration 820 remains in the same position after the virtual keyboard is presented according to the third configuration 820, the user's finger will remain at the same position of the virtual key 808 in the third configuration 820 to provide the user a level of continuity even though the size and position of the virtual keyboard 802 has changed, as well as the size and position of other virtual keys in the virtual keyboard 802.

In some cases, the extended reality system 100 can randomly vary when to render the virtual keyboard 802 according to the first configuration 800, the second configuration 810, and/or the third configuration 820. Moreover, in some cases, the extended reality system 100 can randomly vary the number of virtual key selections to trigger a different configuration (e.g., 800, 810, or 820) used for the virtual keyboard 802. For example, the extended reality system 100 can change the configuration of the virtual keyboard 802 between configurations 800, 810, and 820 after (or when) a virtual key is selected/pressed or after n number of virtual keys are selected/pressed, where n is a number greater than one.

In other cases, the extended reality system 100 can render the virtual keyboard 802 according to the first configuration 800 a certain percentage of times, the second configuration 810 a certain percentage of times, and the third configuration 820 a certain percentage of times, where the percentages between the first configuration 800, the second configuration 810, and the third configuration 820 can change or remain static. In some examples, the extended reality system 100 can vary when to render the virtual keyboard 802 according to the first configuration 800, the second configuration 810, and the third configuration 820 based on a certain sequence.

In some cases, every n number of times the extended reality system 100 renders the virtual keyboard 802, the extended reality system 100 can change the ratio/percentage of times it uses the first configuration 800, the second configuration 810, and the third configuration 820 to render the virtual keyboard. In some examples, the extended reality system 100 can implement more layers of randomness/variation in the rendering of the virtual keyboard 802. For example, in some cases, the n number can define an interval for changing the ratio/percentage of renderings according to the first configuration 800, the second configuration 820, and the third configuration 80. To illustrate, if n represents the five ten (5), the extended reality system 100 in the previous example can change the ratio/percentage of renderings (of the virtual keyboard 802) according to the first configuration 800, the second configuration 810, and the third configuration 820 every five times it renders the virtual keyboard 802.

However, in other illustrative examples, n can represent a sequence such as five-ten-two (5-10-3). In this example, the sequence n would provide for changing the ratio/percentage of renderings according to the first configuration 800, the second configuration 800, and the third configuration 820 after five renderings, then again after ten renderings, then again after three renderings, etc. This can provide further layers of variation to the configuration used for rendering the virtual keyboard 802, which in some cases can provide additional protection for the user's data.

In some examples, the extended reality system 100 can select the size and/or position of the virtual keyboard 802 and/or virtual keys in the virtual keyboard 802 randomly and/or based on a specific ratio(s), sequence(s), and/or variations as previously described with respect to the first configuration 800, the second configuration 810, and the third configuration 820. Moreover, the extended reality system 100 can select the initial size/position of the virtual keyboard 802 (e.g., the size/position of the virtual keyboard 802 in the first rendering) randomly and/or based on a specific ratio(s), sequence(s), and/or variations as previously described with respect to the first configuration 800, the second configuration 810, and the third configuration 820.

Figure 9:
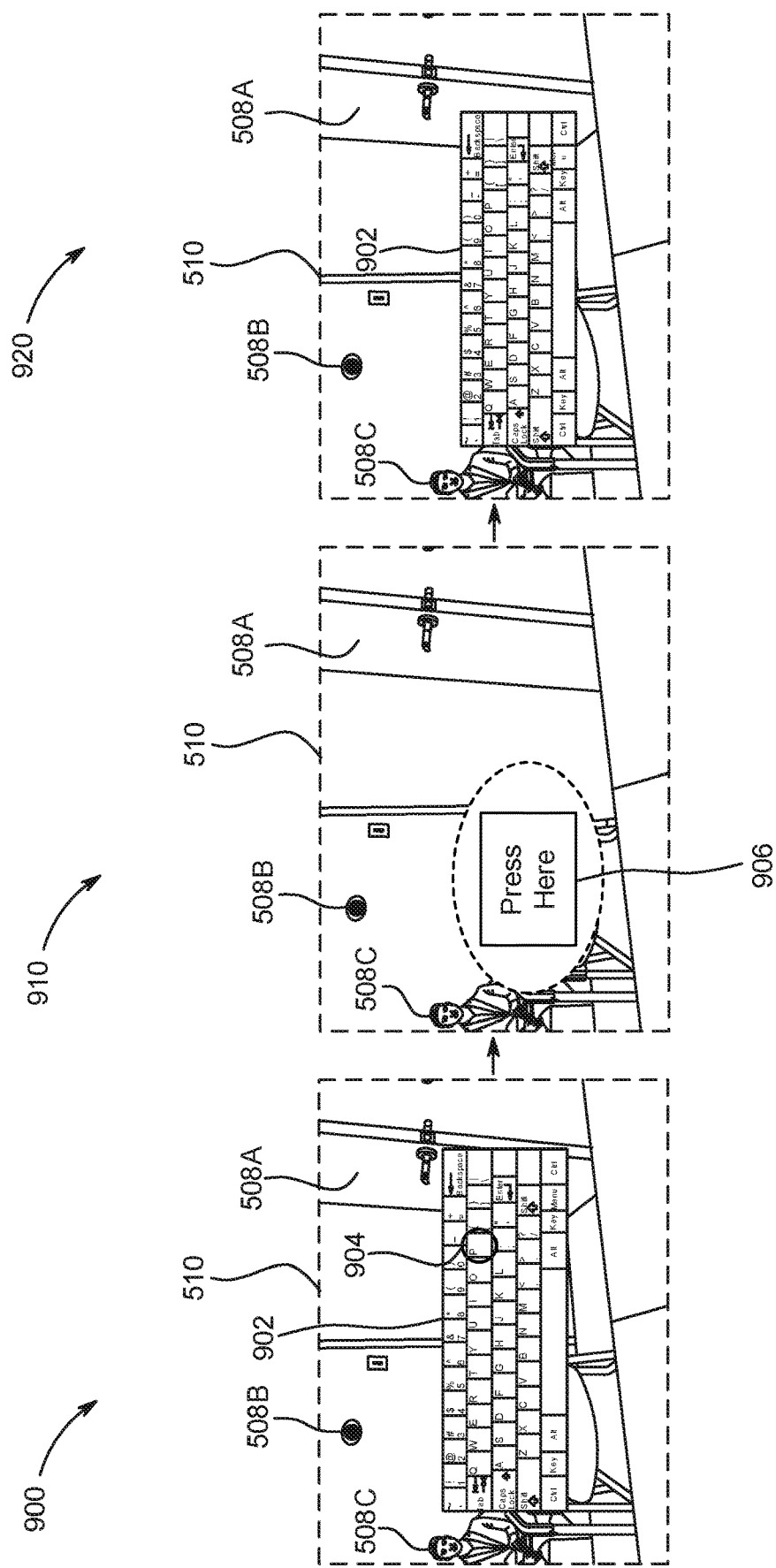

FIG. 9 illustrates another example obfuscated virtual control interface use case involving a virtual keyboard 902. In this example, the extended reality system 100 can provide a first rendering 900 of the virtual keyboard 902 for the user to enter text. After the user selects/presses a virtual key 904 on the virtual keyboard 902, the extended reality system 100 can generate a second rendering 910 that introduces a fake keypress 906. The fake keypress 906 is an example of a "decoy input element". The fake keypress 906 can be also be referred to as a fake, junk, decoy and/or non-functional virtual key that the user is asked to select/press to provide a level of randomness or variation in the user interactions, obfuscates the length of the text entered by the user through the virtual keyboard 902, and/or obfuscates the location/position of the virtual keyboard 902 (and/or associated virtual keys) at different times, etc.

After the user selects/presses the fake keypress 906, the extended reality system 100 can generate a third rendering 920 which can include the virtual keyboard 902 for the user to continue entering text. In some cases, the extended reality system 100 can implement a certain number, percentage, and/or sequence of fake keypresses between the first rendering 900 and the third rendering 920 so the user can select/press multiple fake keypresses between renderings of the virtual keyboard 902 to provide additional randomness or variation in the user interactions, the length of the text entered by the user, the location/position of the virtual keyboard 902, etc. Moreover, in some cases, the extended reality system 100 can render the fake keypress 906 without the virtual keyboard 902. In other cases, the extended reality system 100 can render the fake keypress 906 along with the virtual keyboard 902. In this example, the extended reality system 100 can disable the virtual keyboard 902 and require the user to select/press the fake keypress 906 one or more times before re-enabling the virtual keyboard 902 or can maintain the virtual keyboard 902 enabled and allow the user to select when to use to fake keypress 906 to provide a decoy/fake input.

In some cases, the extended reality system 100 can implement the fake keypress 906 after a certain number, percentage, and/or sequence of renderings of the virtual keyboard 902 and/or inputs through the virtual keyboard 902. For example, the extended reality system 100 can implement the second rendering 910 with the fake keypress 906 each time the user selects a virtual key from the virtual keyboard 902 or after the user selects a certain number of virtual keys from the virtual keyboard 902.

In some examples, the extended reality system 100 can maintain or vary the configuration (e.g., size, position, location, etc.) of the virtual keyboard 902 (and/or associated virtual keys). For example, the extended reality system 100 can maintain or vary the configuration of the virtual keyboard 902 before and after the second rendering 910 with the fake keypress 906 (e.g., at the rendering 900 and the third rendering 920). In some cases, the extended reality system 100 can vary the configuration of the virtual keyboard 902 randomly, after a certain number of instances, according to a certain ratio or sequence, etc., as previously described with respect to FIG. 8.

Figure 10:
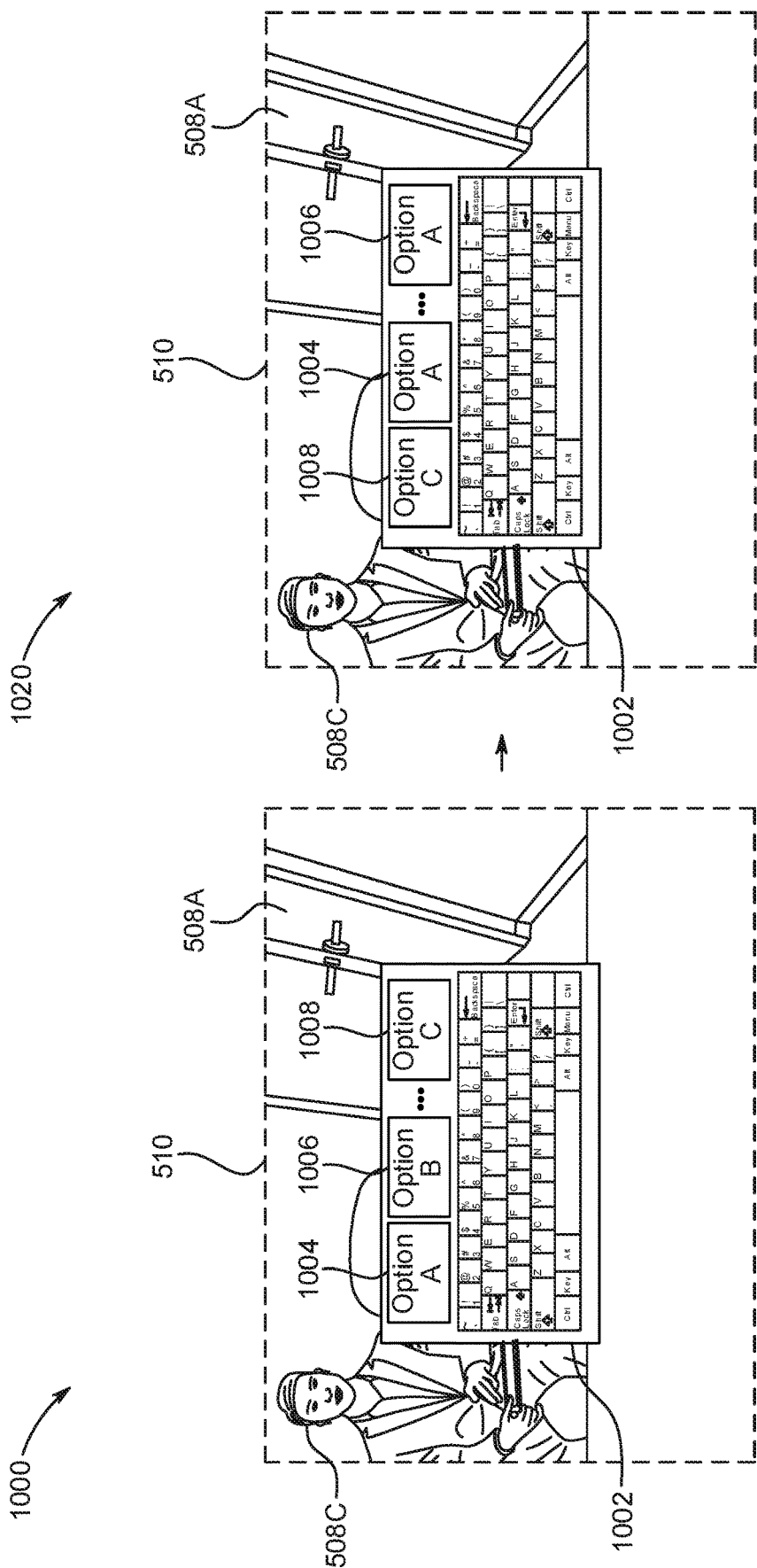
FIG. 10 illustrates an example obfuscated virtual control interface use case involving a virtual keyboard and predictive input options, in accordance with some examples of the present disclosure.

FIG. 10 illustrates an example obfuscated virtual control interface use case involving a virtual keyboard 1002 and predictive input options 1004, 1006, and 1008. In this example, the extended reality system 100 can provide a first rendering 1000 of the virtual keyboard 1002 along with a second configuration of predictive input options 1004-1008. At a later time, the extended reality system 100 can provide a second rendering 1020.

In some examples, the predictive input options 1004-1008 can represent predictive text provided when/as the user enters text through the virtual keyboard 1002. In other examples, the predictive input options 1004-1008 can include other predictive inputs such as, for example and without limitation, a navigation option, an XR session management option (e.g., login, logout, switch profiles, switch avatars, switch screens, etc.), a controls options (e.g., an option for switching from a virtual keyboard to a different virtual interface, an option for changing a keyboard layout, an option for accessing other XR functionalities, etc.), and/or any other input options. Moreover, in some examples, the extended reality system 100 can vary the number of predictive input options provided and/or can provide more or less predictive input options than those shown in FIG. 10.

In some cases, as the user enters text after one or more keypresses, the extended reality system 100 can update the predictive input options 1004-1008. For example, after each keypress, the extended reality system 100 can update the predictive input options 1004-1008 (e.g., to account for the last keypress). As the extended reality system 100 updates the predictive input options 1004-1008, the extended reality system 100 can vary the configuration (e.g., the order, size, location/position, number, etc.) of predictive input options 1004-1008. In some examples, the extended reality system 100 can vary the configuration of predictive input options 1004-1008 after each keypress, after a certain number of keypresses, according to a certain sequence of keypresses, according to certain time intervals, randomly, and/or according to any other variation scheme.

In some examples, the extended reality system 100 can vary a configuration and/or one or more aspects of the predictive input options 1004-1004 as previously described with respect to any of FIGS. 5 through 7. Moreover, in some examples, the extended reality system 100 can vary a configuration and/or one or more aspects of the predictive input options 1004-1004 according to any frequency as previously described with respect to any of FIGS. 5 through 7.

Having disclosed example systems, components and concepts, the disclosure now turns to the example method 1100 for generating an obfuscated control interface for an XR experience, as shown in FIG. 11. The steps outlined herein are non-limiting examples provided for illustration purposes, and can be implemented in any combination thereof, including combinations that exclude, add, or modify certain steps.

At block 1102, the method 1100 can include determining a pose of an extended reality device (e.g., 100) within a mapped scene of a physical environment (e.g., 510) associated with the extended reality device. In some examples, the pose of the extended reality device can be calculated based on one or more images of a scene obtained by one or more image sensors (e.g., 102, 118) and measurements from one or more other sensors.

In some cases, the one or more other sensors can include an accelerometer (e.g., 104) and a gyroscope (e.g., 106). Moreover, the measurements can include a rotational vector (e.g., yaw, pitch, roll) and a motion vector (e.g., up/down, left/right, forward/back).

At block 1104, the method 1100 can include rendering a virtual control interface (e.g., 502, 602-606, 704-706, 802, 902, 1002-1008) within the mapped scene according to a configuration. The virtual control interface can be rendered according to the configuration at a first time. In some examples, the configuration can include a first size, a first position relative to the pose of the extended reality device, a first ordering of input elements (of the virtual control interface) relative to each other, and/or a first number of input elements (of the virtual control interface).

For example, the virtual control interface can be rendered with a specific size, position, ordering of input elements, and/or number of input elements. As another example, the input elements on the virtual control interface can be rendered according to a specific size, relative position, and/or relative ordering.

At block 1106, the method 1100 can include adjusting the configuration of the virtual control interface based on a privacy characteristic of data associated with the virtual control interface (e.g., a privacy and/or security level, a privacy and/or security preference, a privacy and/or security regulation, a type of data, etc.) and/or one or more characteristics of the physical environment associated with the extended reality device (e.g., a level of privacy, a presence of other persons and/or risk objects in the physical environment, a visibility of other persons and/or risk objects in the physical environment, a privacy and/or security event, etc.). In some cases, the virtual control interface can be rendered according to the adjusted configuration at a second time that is different than the first time. Moreover, the adjusted configuration can include a second size, a second ordering of input elements (of the virtual control interface), a second number of input elements (of the virtual control interface), and/or a second position relative to the pose of the extended reality device and/or the first position associated with the configuration.

In some examples, rendering the virtual control interface according to the second configuration can include switching the rendering of the virtual control interface from the first configuration to the second configuration. In some cases, the method 1100 can include receiving a number of inputs via the virtual control interface. Based on receiving the number of inputs via the virtual control interface, the method 1100 can include switching the rendering of the virtual control interface from the configuration to the adjusted configuration me. In some examples, the number of inputs can be based on a number of virtual key selections. For instance, as noted above, the extended reality system 100 can randomly vary the number of virtual key selections to trigger a different configuration (e.g., 800, 810, or 820) used for the virtual keyboard 802. In one illustrative example, the extended reality system 100 can change the configuration of the virtual keyboard 802 between configurations 800, 810, and 820 after (or when) a virtual key is selected/pressed or after n number of virtual keys are selected/pressed (where n is a number greater than one).

In some cases, the one or more characteristics of the physical environment can include a presence in the physical environment of a person, one or more recording devices, and/or one or more objects that enable viewing access to one or more regions in the physical environment from outside of the physical environment. In some aspects, the method 1100 can include determining that the virtual control interface is mapped to a region in the physical environment that is within a field of view (FOV) of a person in the physical environment, a recording device in the physical environment, and/or an object in the physical environment that enables viewing access to the region from outside of the physical environment. In some examples, the person is different from a user associated with the extended reality device. Based on determining that the virtual control interface is mapped to the region in the physical environment, the method 1100 can include switching the rendering of the virtual control interface from the configuration to the adjusted configuration.

In some cases, adjusting the configuration of the virtual control interface can include reordering one or more input elements of the virtual control interface according to the second ordering of input elements. In some examples, the one or more input elements can be reordered relative to one or more different input elements of the virtual control interface, and reordering the one or more input elements can include rendering the one or more input elements according to a position and/or ordering of the one or more different input elements corresponding to the first ordering of input elements.

In some cases, rendering the virtual control interface according to the configuration can include rendering one or more input elements of the virtual control interface at the first position, and adjusting the configuration of the virtual control interface can include rendering one or more different input elements of the virtual control interface at the second position. In some examples, the first position and the second position can be a same or different position within the mapped scene.

In some cases, the virtual control interface can include a virtual keyboard and the input elements can include virtual keys. In some aspects, the method 1100 can include receiving a selection of a virtual key of the virtual keyboard while the virtual keyboard is rendered according to the configuration, and after receiving the selection of the virtual key, rendering the virtual keyboard according to the adjusted configuration.

In some examples, adjusting the configuration of the virtual keyboard can include rendering the virtual key (e.g., 804 or 808) at a same position within the mapped scene used to render the virtual key during the configuration while rendering one or more different virtual keys of the virtual keyboard at a different position within the mapped scene used to render the one or more different virtual keys during the configuration. For example, a position of the virtual key during the configuration can be projected (e.g., projection 806A) to the position of the virtual key during the adjusted configuration.

In some cases, adjusting the configuration of the virtual keyboard can include rendering the virtual keyboard according to the second size and the second position, the second size and the second position being different than the first size and/or the first position.

In some aspects, the method 1100 can include rendering, while the virtual keyboard is rendered according to the configuration, a set of predictive input elements (e.g., 1004-1008). In some examples, the set of predictive input elements can be rendered according to an additional configuration including a third size, a third position, and/or a third ordering relative to each other. In some aspects, the method 1100 can further include updating, based on the selection of the virtual key, a content and/or a functionality associated with one or more predictive elements of the set of predictive input elements, and switching the rendering of the set of predictive input elements from the additional configuration to a different additional configuration. The different additional configuration can include, for example, a fourth size, a fourth position, and/or a fourth ordering relative to each other.

In some aspects, the method 1100 can include detecting a region within the physical environment estimated to be within a FOV of a user associated with the extended reality device and out of a respective FOV of a person in the physical environment, a recording device in the physical environment, and/or an object in the physical environment that enables viewing access from outside of the physical environment. In some examples, the first position, the second position, the first size, and/or the second size can be selected based on the region estimated to be within the FOV of the user and out of the respective FOV of the at least one of the person, the recording device, and/or the object. For example, the size, position, and/or characteristics of the virtual control interface in the configuration and/or the adjusted configuration can be selected such that at least a portion of the virtual control interface and/or associated user interactions are within the region and thus occluded from the person, the recording device, and/or the object.

In some aspects, the method 1100 can include rendering a decoy input element (e.g., 906), receiving a selection of the decoy input element, and in response to the selection of the decoy input element, rendering the virtual control interface according to the adjusted configuration. In some examples, the decoy element can be rendered after rendering the virtual control interface according to the configuration.

In some aspects, the method 1100 can include detecting one or more events associated with the virtual control interface and based on the one or more events, switching the rendering of the virtual control interface from the configuration to the adjusted configuration. In some examples, the one or more events can include a timeout event (e.g., lapsing of a configured time period without a user input), a security condition (e.g., a user entering the scene, a recording device being detected, private data being rendered and/or requested via the virtual control interface, etc.), and/or an unexpected input (e.g. a user input detected in an interface region/element that is not configured to receive input, a user input detected at a time that the virtual control interface is not requesting inputs and/or rendering input elements, a user input detected that does not match the type of input and/or does not provide the type of input data expected by the virtual control interface, etc.).

In some examples, the method 1100 may be performed by one or more computing devices or apparatuses. In one illustrative example, the method 1100 can be performed by the extended reality system 100 shown in FIG. 1 and/or one or more computing devices with the computing device architecture 1200 shown in FIG. 12. In some cases, such a computing device or apparatus may include a processor, microprocessor, microcomputer, or other component of a device that is configured to carry out the steps of the method 1100. In some examples, such computing device or apparatus may include one or more sensors configured to capture image data. For example, the computing device can include a smartphone, a head-mounted display, a mobile device, or other suitable device. In some examples, such computing device or apparatus may include a camera configured to capture one or more images or videos. In some cases, such computing device may include a display for displaying images. In some examples, the one or more sensors and/or camera are separate from the computing device, in which case the computing device receives the sensed data. Such computing device may further include a network interface configured to communicate data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The method 1100 is illustrated as a logical flow diagram, the operations of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the method 1100 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

FIG. 12 illustrates an example computing device architecture 1200 of an example computing device which can implement various techniques described herein. For example, the computing device architecture 1200 can implement at least some portions of the extended reality system 100 shown in FIG. 1 and/or the extended reality system 220 shown in FIG. 2. The components of the computing device architecture 1200 are shown in electrical communication with each other using a connection 1205, such as a bus. The example computing device architecture 1200 includes a processing unit (CPU or processor) 1210 and a computing device connection 1205 that couples various computing device components including the computing device memory 1215, such as read only memory (ROM) 1220 and random access memory (RAM) 1225, to the processor 1210.

The computing device architecture 1200 can include a cache of high-speed memory connected directly with, in close proximity to, or integrated as part of the processor 1210. The computing device architecture 1200 can copy data from the memory 1215 and/or the storage device 1230 to the cache 1112 for quick access by the processor 1210. In this way, the cache can provide a performance boost that avoids processor 1210 delays while waiting for data. These and other modules can control or be configured to control the processor 1210 to perform various actions. Other computing device memory 1215 may be available for use as well. The memory 1215 can include multiple different types of memory with different performance characteristics. The processor 1210 can include any general purpose processor and a hardware or software service stored in storage device 1230 and configured to control the processor 1210 as well as a special-purpose processor where software instructions are incorporated into the processor design. The processor 1210 may be a self-contained system, containing multiple cores or processors, a bus, memory controller, cache, etc. A multi-core processor may be symmetric or asymmetric.

To enable user interaction with the computing device architecture 1200, an input device 1245 can represent any number of input mechanisms, such as a microphone for speech, a touch-sensitive screen for gesture or graphical input, keyboard, mouse, motion input, speech and so forth. An output device 1235 can also be one or more of a number of output mechanisms known to those of skill in the art, such as a display, projector, television, speaker device. In some instances, multimodal computing devices can enable a user to provide multiple types of input to communicate with the computing device architecture 1200. The communication interface 1240 can generally govern and manage the user input and computing device output. There is no restriction on operating on any particular hardware arrangement and therefore the basic features here may easily be substituted for improved hardware or firmware arrangements as they are developed.

Storage device 1230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1220, and hybrids thereof. The storage device 1230 can include software, code, firmware, etc., for controlling the processor 1210. Other hardware or software modules are contemplated. The storage device 1230 can be connected to the computing device connection 1205. In one aspect, a hardware module that performs a particular function can include the software component stored in a computer-readable medium in connection with the necessary hardware components, such as the processor 1210, connection 1205, output device 1235, and so forth, to carry out the function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. A method comprising:
   determining a pose of an extended reality device within a mapped scene of a physical environment associated with the extended reality device;
   rendering, by the extended reality device, a virtual control interface within the mapped scene, the virtual control interface being rendered according to a configuration comprising a first size, a first position relative to the pose of the extended reality device, a first ordering of input elements, and a first number of input elements;
   determining, by the extended reality device, a privacy condition in the physical environment based on sensor data from one or more sensors of the extended reality device, the privacy condition being associated with a presence in the physical environment of at least one of a person, one or more recording devices, and one or more objects that enable viewing access to one or more regions in the physical environment from outside of the physical environment; and
   in response to determining the privacy condition in the physical environment, adjusting, by the extended reality device, the configuration of the virtual control interface rendered by the extended reality device, the adjusted configuration comprising at least one of a second size, a second ordering of input elements, a second number of input elements, and a second position relative to the pose of the extended reality device and different from the first position.

2. The method of claim 1, further comprising:
   receiving a number of inputs via the virtual control interface; and
   based on receiving the number of inputs via the virtual control interface, switching the rendering of the virtual control interface from the configuration to a second configuration comprising the adjusted configuration.

3. The method of claim 1, further comprising:
   determining that the virtual control interface is mapped to a region in the physical environment that is within a field of view (FOV) of at least one of the person, the one or more recording devices, and the one or more objects, wherein the person is different from a user associated with the extended reality device; and
   based on determining that the virtual control interface is mapped to the region in the physical environment, switching the rendering of the virtual control interface from the configuration to the adjusted configuration.

4. The method of claim 1, wherein adjusting the configuration of the virtual control interface comprises reordering one or more input elements of the virtual control interface according to the second ordering of input elements, the one or more input elements being reordered relative to one or more different input elements of the virtual control interface, and wherein reordering the one or more input elements comprises rendering the one or more input elements according to at least one of a position and an ordering of the one or more different input elements corresponding to the first ordering of input elements.

5. The method of claim 1, wherein rendering the virtual control interface according to the configuration comprises rendering one or more input elements of the virtual control interface at the first position, and wherein adjusting the configuration of the virtual control interface comprises rendering one or more different input elements of the virtual control interface at the second position.

6. The method of claim 1, wherein the virtual control interface comprises a virtual keyboard and the input elements comprise virtual keys, the method further comprising:
receiving a selection of a virtual key of the virtual keyboard while the virtual keyboard is rendered according to the configuration; and
after receiving the selection of the virtual key, rendering the virtual keyboard according to the adjusted configuration.

7. The method of claim 6, wherein adjusting the configuration of the virtual keyboard comprises rendering the virtual key at a same position within the mapped scene used to render the virtual key during the configuration while rendering one or more different virtual keys of the virtual keyboard at a different position within the mapped scene used to render the one or more different virtual keys during the configuration.

8. The method of claim 6, wherein adjusting the configuration of the virtual keyboard comprises rendering the virtual keyboard according to the second size and the second position, the second size and the second position being different than the first size and the first position.

9. The method of claim 6, further comprising:
rendering, while the virtual keyboard is rendered according to the configuration, a set of predictive input elements, the set of predictive input elements being rendered according to an additional configuration comprising at least one of a third size, a third position, and a third ordering relative to each other;
updating, based on the selection of the virtual key, at least one of a content and a functionality associated with one or more predictive elements of the set of predictive input elements; and
switching the rendering of the set of predictive input elements from the additional configuration to a different additional configuration, the different additional configuration comprising at least one of a fourth size, a fourth position, and a fourth ordering relative to each other.

10. The method of claim 1, further comprising:
detecting a region within the physical environment estimated to be within a field of view (FOV) of a user associated with the extended reality device and out of a respective FOV of at least one of the person, the one or more recording devices, and the one or more objects, wherein at least one of the first position, the second position, the first size, and the second size is selected based on the region estimated to be within the FOV of the user and out of the respective FOV of the at least one of the person, the one or more recording devices, and the one or more objects.

11. The method of claim 10, further comprising:
rendering a decoy input element, the decoy input element being rendered after rendering the virtual control interface according to the configuration;
receiving a selection of the decoy input element; and
in response to the selection of the decoy input element, rendering the virtual control interface according to the adjusted configuration.

12. The method of claim 1, further comprising:
detecting one or more events associated with the virtual control interface, the one or more events comprising at least one of a timeout event, a security condition, and an unexpected input; and
based on the one or more events, switching the rendering of the virtual control interface from the configuration to the adjusted configuration.

13. An extended reality apparatus comprising:
memory; and
one or more processors coupled to the memory, the one or more processors being configured to:
determine a pose of the extended reality apparatus within a mapped scene of a physical environment associated with the extended reality apparatus;
render a virtual control interface within the mapped scene, the virtual control interface being rendered according to a configuration comprising a first size, a first position relative to the pose of the extended reality apparatus, a first ordering of input elements, and a first number of input elements;
determine a privacy condition in the physical environment based on sensor data from one or more sensors of the extended reality apparatus, the privacy condition being associated with a presence in the physical environment of at least one of a person, one or more recording devices, and one or more objects that enable viewing access to one or more regions in the physical environment from outside of the physical environment; and
in response to determining the privacy condition in the physical environment, adjust the configuration of the virtual control interface rendered by the extended reality apparatus, the adjusted configuration comprising at least one of a second size, a second ordering of input elements, a second number of input elements, and a second position relative to the pose of the extended reality apparatus and different from the first position.

14. The extended reality apparatus of claim 13, the one or more processors being configured to:
receive a number of inputs via the virtual control interface; and
based on receiving the number of inputs via the virtual control interface, switch the rendering of the virtual control interface from the configuration to the adjusted configuration.

15. The extended reality apparatus of claim 13, the one or more processors being configured to:
determine that the virtual control interface is mapped to a region in the physical environment that is within a field of view (FOV) of at least one of the person, the one or more recording devices, and the one or more objects, wherein the person is different from a user associated with the extended reality apparatus; and
based on determining that the virtual control interface is mapped to the region in the physical environment, switch the rendering of the virtual control interface from the configuration to the adjusted configuration.

16. The extended reality apparatus of claim 13, wherein, to adjust the configuration of the virtual control interface, the one or more processors are configured to:
reorder one or more input elements of the virtual control interface according to the second ordering of input elements, the one or more input elements being reordered relative to one or more different input elements of the virtual control interface, and wherein reordering the one or more input elements comprises rendering the one or more input elements according to at least one of a position and an ordering of the one or more different input elements corresponding to the first ordering of input elements.

17. The extended reality apparatus of claim 13, wherein, to render the virtual control interface according to the configuration, the one or more processors are configured to:
render one or more input elements of the virtual control interface at the first position, and wherein adjusting the configuration of the virtual control interface comprises rendering one or more different input elements of the virtual control interface at the second position.

18. The extended reality apparatus of claim 13, wherein the virtual control interface comprises a virtual keyboard and the input elements comprise virtual keys, the one or more processors being configured to:
receive a selection of a virtual key of the virtual keyboard while the virtual keyboard is rendered according to the configuration; and
after receiving the selection of the virtual key, render the virtual keyboard according to the adjusted configuration.

19. The extended reality apparatus of claim 18, wherein, to adjust the configuration of the virtual keyboard, the one or more processors are configured to:
render the virtual key at a same position within the mapped scene used to render the virtual key during the configuration while rendering one or more different virtual keys of the virtual keyboard at a different position within the mapped scene used to render the one or more different virtual keys during the configuration.

20. The extended reality apparatus of claim 18, wherein, to adjust the configuration of the virtual keyboard, the one or more processors are configured to:
render the virtual keyboard according to the second size and the second position, the second size and the second position being different than the first size and the first position.

21. The extended reality apparatus of claim 18, the one or more processors being configured to:
render, while the virtual keyboard is rendered according to the configuration, a set of predictive input elements, the set of predictive input elements being rendered according to an additional configuration comprising at least one of a third size, a third position, and a third ordering relative to each other;
update, based on the selection of the virtual key, at least one of a content and a functionality associated with one or more predictive elements of the set of predictive input elements; and
switch the rendering of the set of predictive input elements from the additional configuration to a different additional configuration, the different additional configuration comprising at least one of a fourth size, a fourth position, and a fourth ordering relative to each other.

22. The extended reality apparatus of claim 13, the one or more processors being configured to:
detect a region within the physical environment estimated to be within a field of view (FOV) of a user associated with the extended reality apparatus and out of a respective FOV of at least one of the person, the one or more recording devices, and the one or more objects, wherein at least one of the first position, the second position, the first size, and the second size is selected based on the region estimated to be within the FOV of the user and out of the respective FOV of the at least one of the person, the one or more recording devices, and the one or more objects.

23. The extended reality apparatus of claim 22, the one or more processors being configured to:
render a decoy input element, the decoy input element being rendered after rendering the virtual control interface according to the configuration;
receive a selection of the decoy input element; and
in response to the selection of the decoy input element, render the virtual control interface according to the adjusted configuration.

24. The extended reality apparatus of claim 13, the one or more processors being configured to:
detect one or more events associated with the virtual control interface, the one or more events comprising at least one of a timeout event, a security condition, and an unexpected input; and
based on the one or more events, switch the rendering of the virtual control interface from the configuration to the adjusted configuration.

25. A non-transitory computer-readable storage medium of an extended reality device comprising instructions stored thereon which, when executed by one or more processors, cause the one or more processors to:
determine a pose of an extended reality device within a mapped scene of a physical environment associated with the extended reality device;
render a virtual control interface within the mapped scene for the extended reality device, the virtual control interface being rendered according to a configuration comprising a first size, a first position relative to the pose of the extended reality device, a first ordering of input elements, and a first number of input elements;
determine a privacy condition in the physical environment based on sensor data from one or more sensors of the extended reality device, the privacy condition being associated with a presence in the physical environment of at least one of a person, one or more recording devices, and one or more objects that enable viewing access to one or more regions in the physical environment from outside of the physical environment; and
in response to determining the privacy condition in the physical environment, adjust the configuration of the virtual control interface rendered for the extended reality device, the adjusted configuration comprising at least one of a second size, a second ordering of input elements, a second number of input elements, and a second position relative to the pose of the extended reality device and different from the first position.

26. The non-transitory computer-readable storage medium of claim 25, comprising instructions stored thereon which, when executed by the one or more processors, cause the one or more processors to:

detect one or more events associated with the virtual control interface, the one or more events comprising at least one of an input and a timeout event; and based on the one or more events, switch the rendering of the virtual control interface from the configuration to the adjusted configuration.

27. The non-transitory computer-readable storage medium of claim 25, the non-transitory computer-readable storage medium comprising instructions stored thereon which, when executed by the one or more processors, cause the one or more processors to:

determine that the virtual control interface is mapped to a region in the physical environment that is within a field of view (FOV) of at least one of the person, the one or more recording devices, and the one or more objects, wherein the person is different from a user associated with the extended reality device; and based on determining that the virtual control interface is mapped to the region in the physical environment, switch the rendering of the virtual control interface from the configuration to the adjusted configuration.

28. The non-transitory computer-readable storage medium of claim 25, wherein adjusting the configuration of the virtual control interface comprises at least one of reordering one or more input elements of the virtual control interface according to the second ordering of input elements and rendering one or more different input elements of the virtual control interface at the second position.

29. The non-transitory computer-readable storage medium of claim 25, wherein the virtual control interface comprises a virtual keyboard and the input elements comprise virtual keys, the non-transitory computer-readable storage medium comprising instructions stored thereon which, when executed by the one or more processors, cause the one or more processors to:

receive a selection of a virtual key of the virtual keyboard while the virtual keyboard is rendered according to the configuration; and after receiving the selection of the virtual key, render the virtual keyboard according to the adjusted configuration.

30. The non-transitory computer-readable storage medium of claim 25, the non-transitory computer-readable storage medium comprising instructions stored thereon which, when executed by the one or more processors, cause the one or more processors to:

detect a region within the physical environment estimated to be within a field of view (FOV) of a user associated with the extended reality device and out of a respective FOV of at least one of the person, the one or more recording devices, and the one or more objects, wherein at least one of the first position, the second position, the first size, and the second size is selected based on the region estimated to be within the FOV of the user and out of the respective FOV of the at least one of the person, the one or more recording devices, and the one or more objects.

\* \* \* \* \*